US006997525B2

(12) United States Patent
Gillengerten

(10) Patent No.: US 6,997,525 B2
(45) Date of Patent: Feb. 14, 2006

(54) AUDIO VISUAL SYSTEM

(76) Inventor: Alan Gillengerten, 1258 Sausalito Way, Tracy, CA (US) 95377

( * ) Notice: Subject to any disclaimer, the term of this patent is extended or adjusted under 35 U.S.C. 154(b) by 0 days.

(21) Appl. No.: 10/752,780

(22) Filed: Jan. 7, 2004

(65) Prior Publication Data
US 2005/0146251 A1    Jul. 7, 2005

Related U.S. Application Data

(63) Continuation-in-part of application No. 10/713,901, filed on Sep. 17, 2003, now abandoned.

(51) Int. Cl.
A47B 81/06 (2006.01)

(52) U.S. Cl. .................... 312/7.2; 312/8.16; 312/21

(58) Field of Classification Search ............ 312/7.2, 312/8.16, 21, 204, 205, 287, 290, 319.5, 312/319.6, 319.7, 319.8; 381/386, 387, 388; 181/199
See application file for complete search history.

(56) References Cited

U.S. PATENT DOCUMENTS

| | | | |
|---|---|---|---|
| 1,652,257 A * | 12/1927 | Stevenson | 312/7.1 |
| 2,109,431 A | 2/1938 | McDonald | |
| D156,474 S * | 12/1949 | Adler | D14/131 |
| 2,547,447 A | 4/1951 | de Boer | |
| 2,577,528 A | 12/1951 | Kennedy | |
| 3,090,462 A | 5/1963 | Huff et al. | |
| 3,167,314 A | 1/1965 | Bentsen | |
| 3,169,772 A | 2/1965 | Bentsen | |
| 3,180,447 A | 4/1965 | Huff et al. | |
| 3,467,455 A | 9/1969 | Caldemeyer | |
| 3,563,622 A * | 2/1971 | Cote | 312/8.4 |
| 3,572,866 A | 3/1971 | Wolanin | |
| 3,627,392 A | 12/1971 | Ruppersburg | |
| 3,680,936 A * | 8/1972 | Backhaus | 312/7.1 |
| 3,754,618 A * | 8/1973 | Sasaki | 181/145 |
| 3,761,152 A * | 9/1973 | Cory | 312/7.2 |
| 3,926,487 A | 12/1975 | Reyes | |
| 3,943,564 A | 3/1976 | Tushinsky | |
| 4,535,870 A | 8/1985 | Lindsay | |
| D323,944 S * | 2/1992 | Maas | D6/436 |
| 5,119,421 A * | 6/1992 | Reime | 381/301 |

(Continued)

FOREIGN PATENT DOCUMENTS

JP          62208797 A       9/1987

(Continued)

*Primary Examiner*—Janet M. Wilkens
(74) *Attorney, Agent, or Firm*—Gene Scott and Patent Law & Venture Group

(57) ABSTRACT

An audio visual system is provided comprising a housing, a video display, at least one speaker support coupled to at least one of the display and the housing, and at least one speaker mounted to and supported by the speaker support, the housing and the at least one speaker each having a front wall, the display and the at least one speaker support being movable from a first state, where the display and the at least one speaker, which is in a first position, are in the housing and hidden from view when viewing the front wall of the housing, to a second state, where the display and the at least one speaker are spaced from the housing and at least partially unobstructed thereby with the at least one speaker being in a second position differently spaced from the display than when in the first position. Among the many advantages of the invention is that the video display and speakers can be hidden from view when the system is not in use. Alternatively, the speaker can be replaced with a speaker box adapted to contain or hold a speaker.

7 Claims, 23 Drawing Sheets

U.S. PATENT DOCUMENTS

| | | | |
|---|---|---|---|
| D330,646 S | * | 11/1992 | Maas .......................... D6/429 |
| 5,303,057 A | | 4/1994 | Davidow et al. |
| 5,647,012 A | * | 7/1997 | Han ........................... 381/386 |
| 5,782,544 A | * | 7/1998 | Johnson, Sr. ................. 312/7.2 |
| 6,005,642 A | | 12/1999 | Meisner et al. |
| 6,057,659 A | * | 5/2000 | Akiyama et al. ........... 181/144 |
| 2002/0084727 A1 | | 7/2002 | Miller |
| 2004/0135476 A1 | | 7/2004 | Gillengerten |

FOREIGN PATENT DOCUMENTS

| | | |
|---|---|---|
| JP | 2000261876 A | 9/2000 |

* cited by examiner

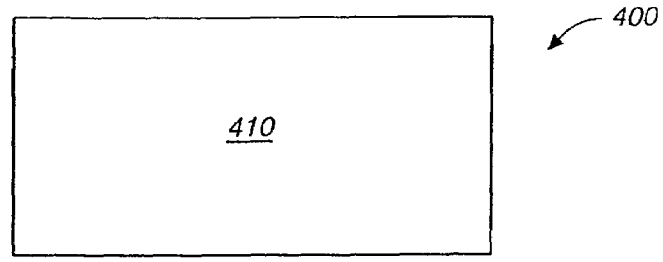
FIG._1A
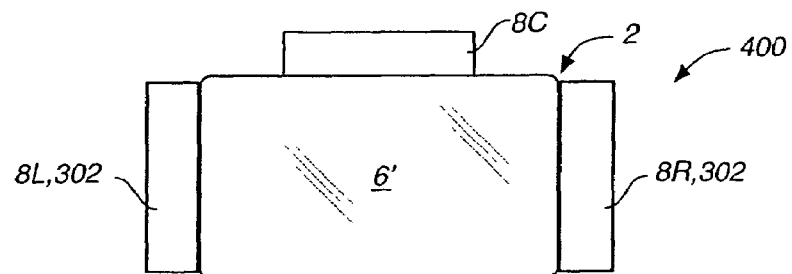
FIG._1B
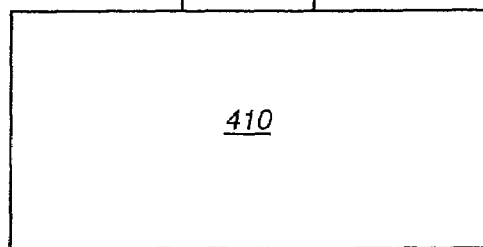
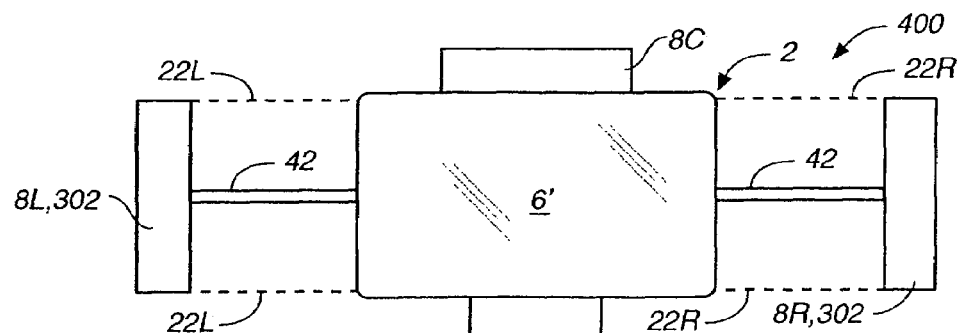
FIG._1C
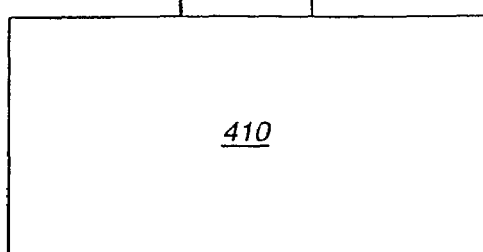

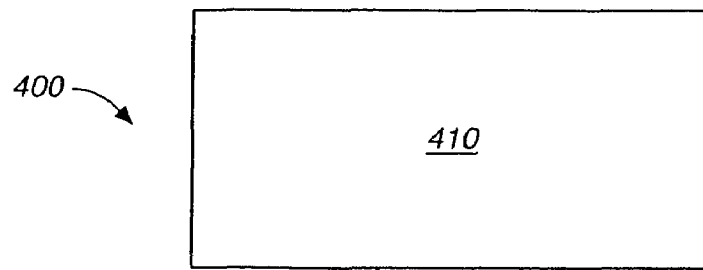
FIG._2A
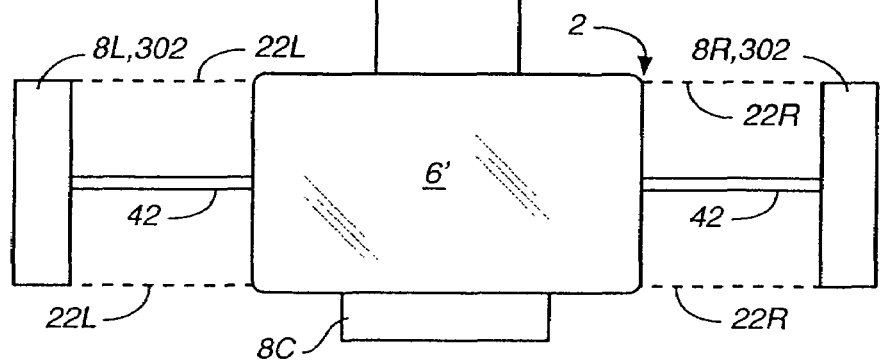
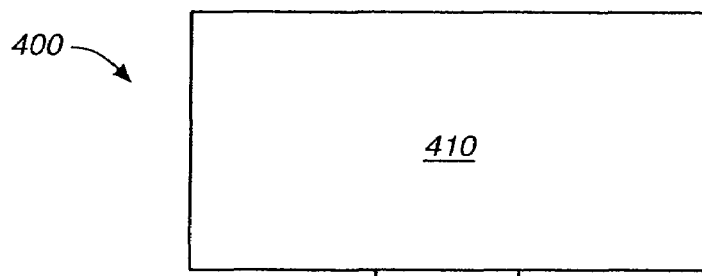
FIG._2B
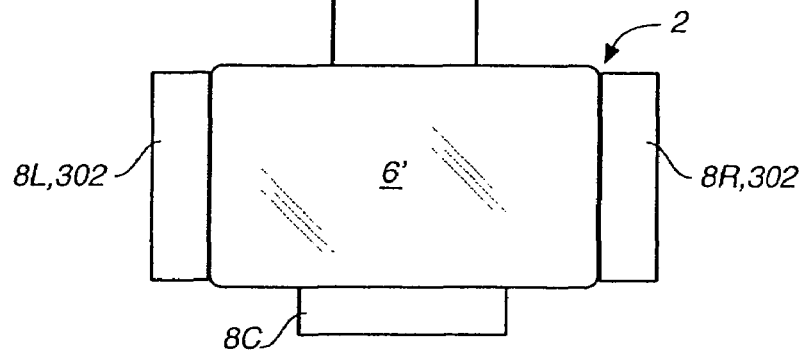

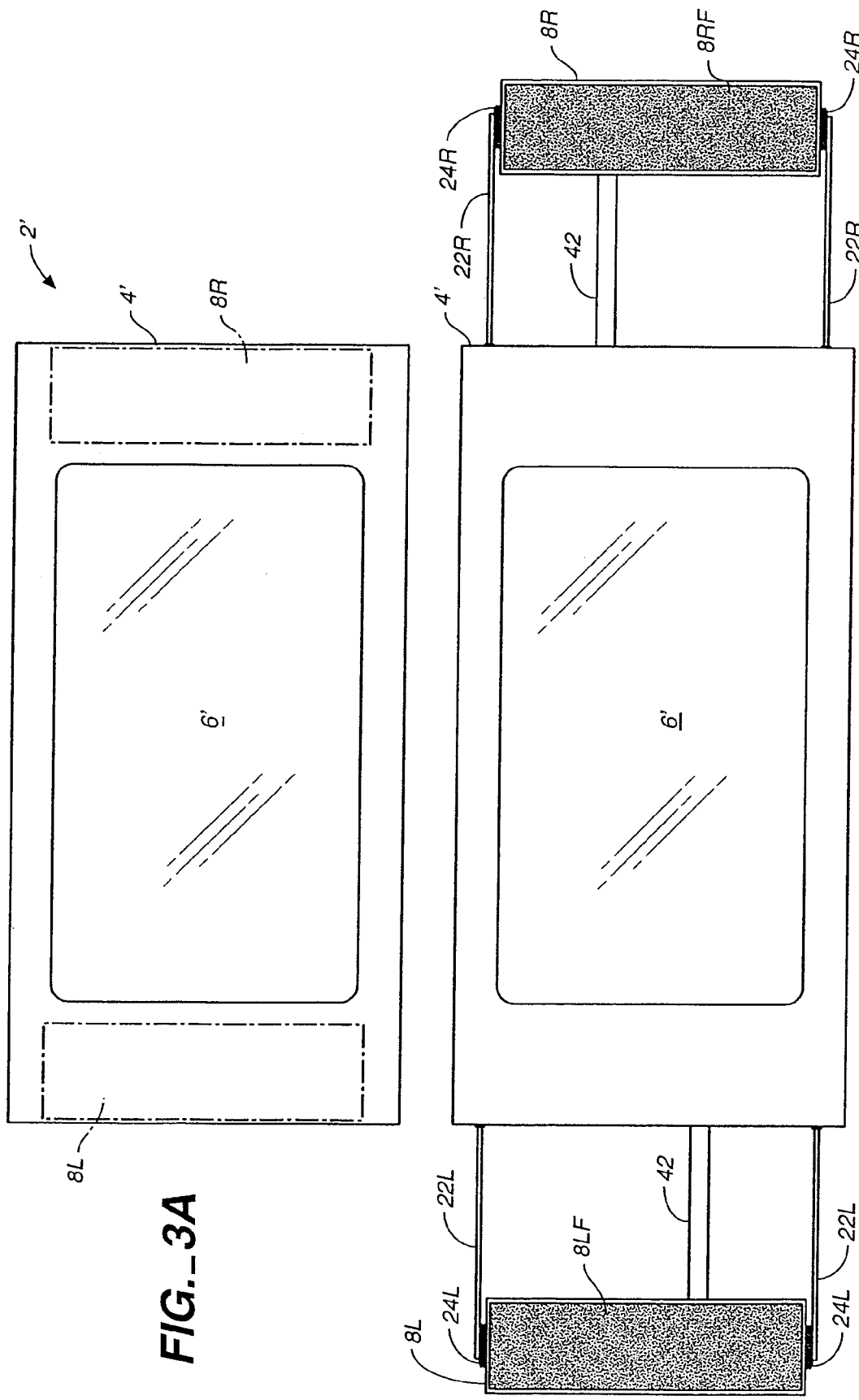

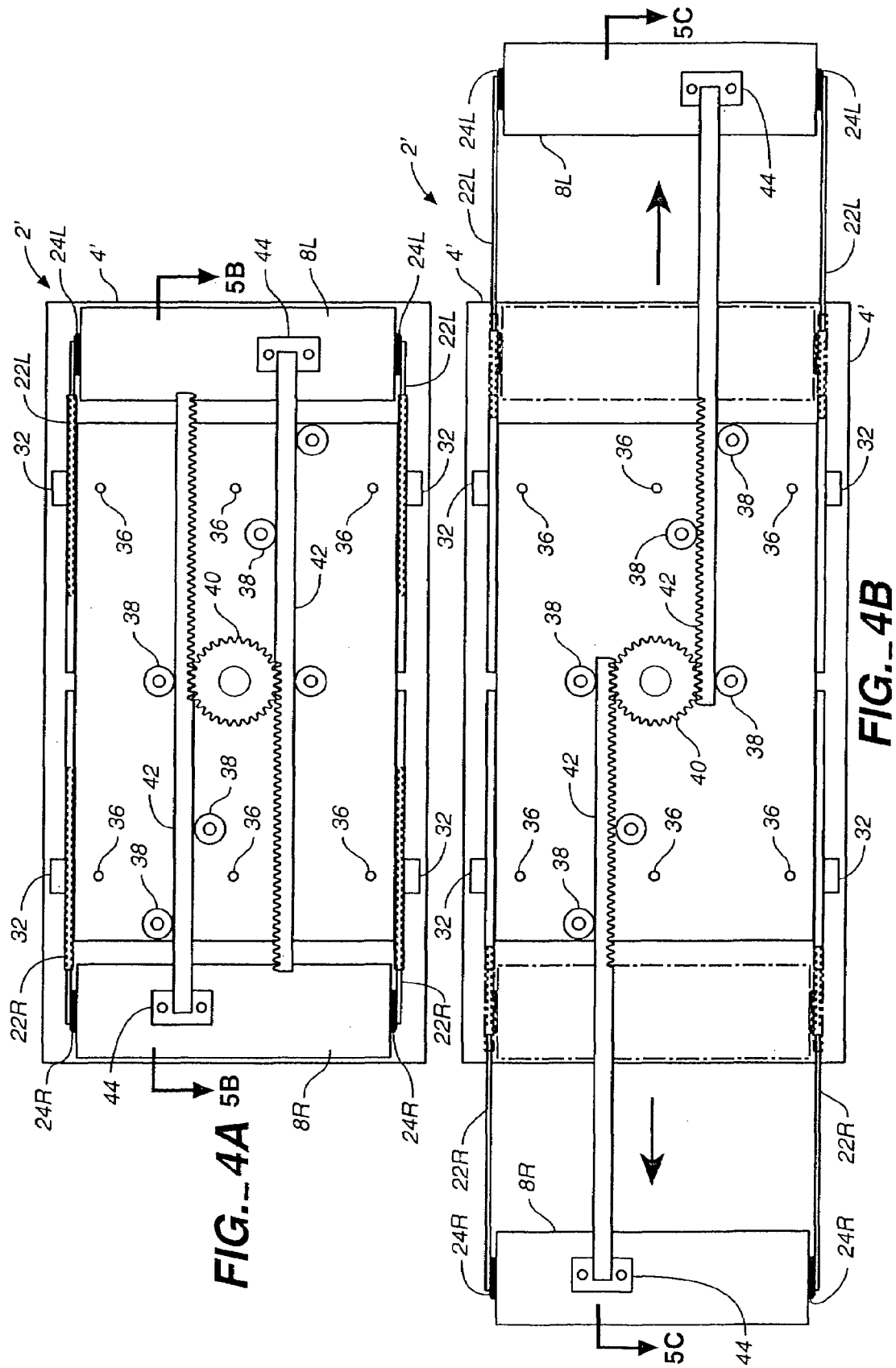

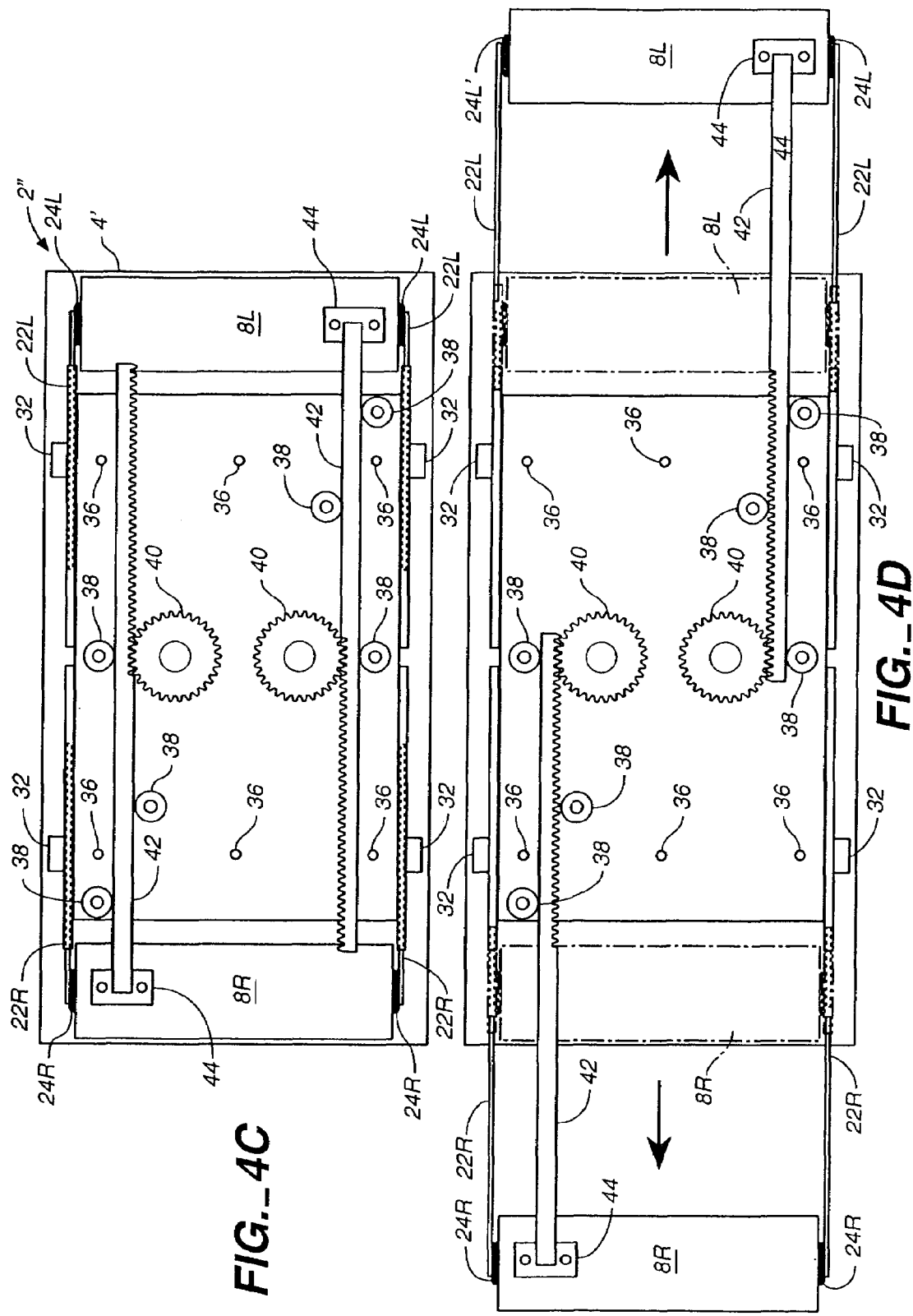

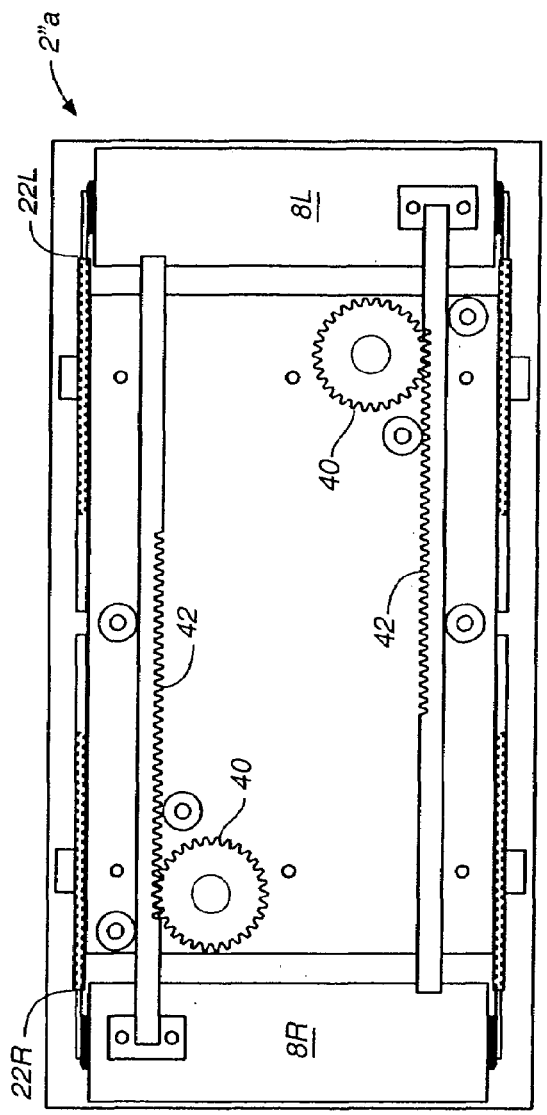
FIG._4E
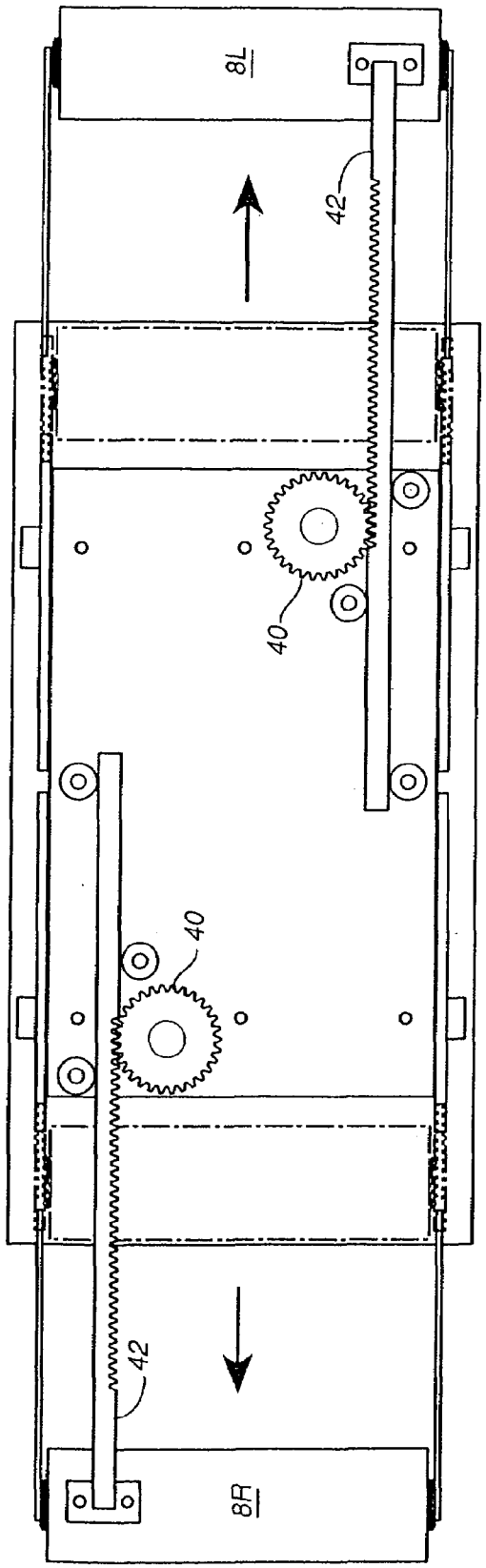
FIG._4F

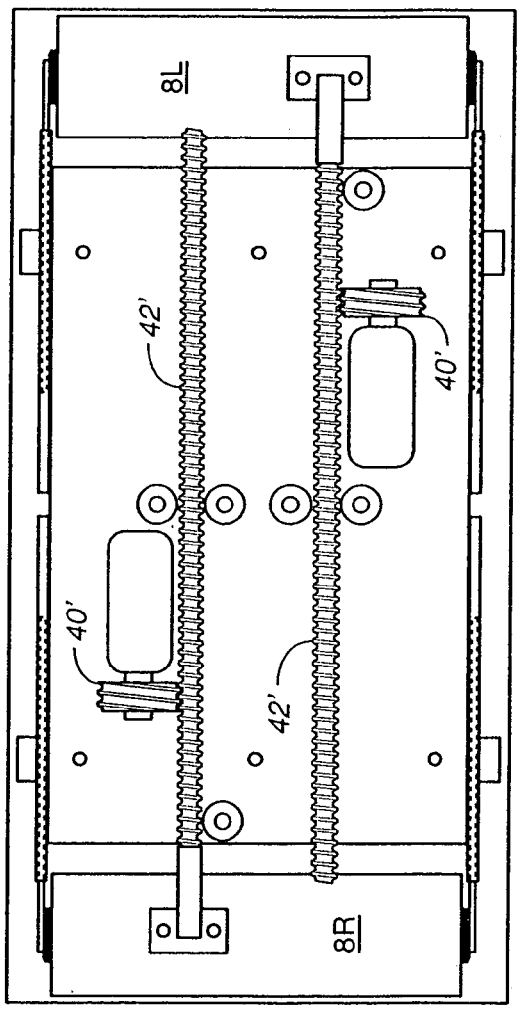
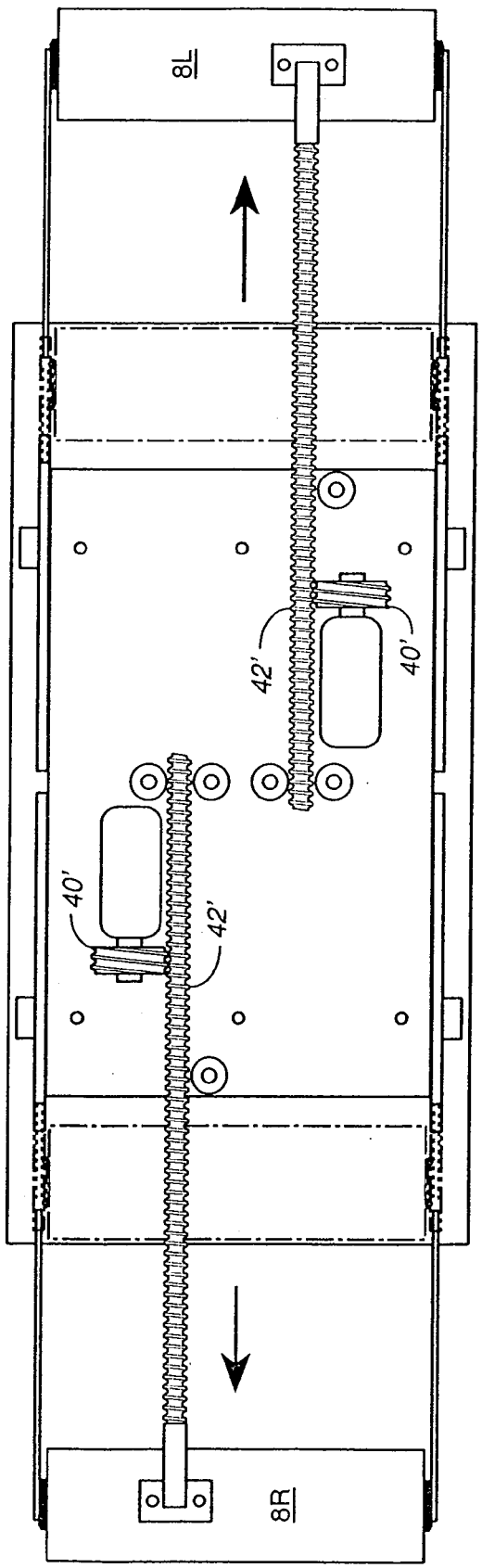
FIG._4G
FIG._4H

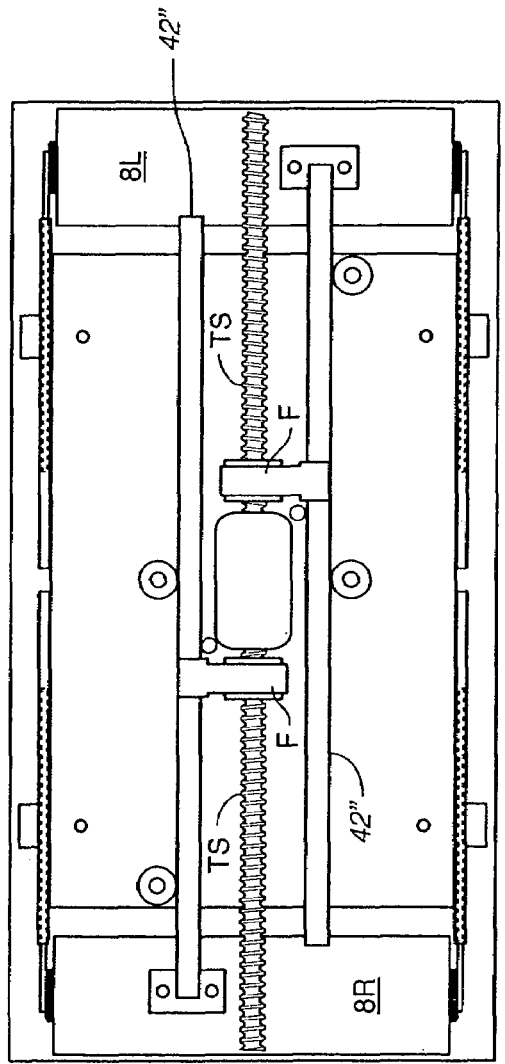
FIG._4I
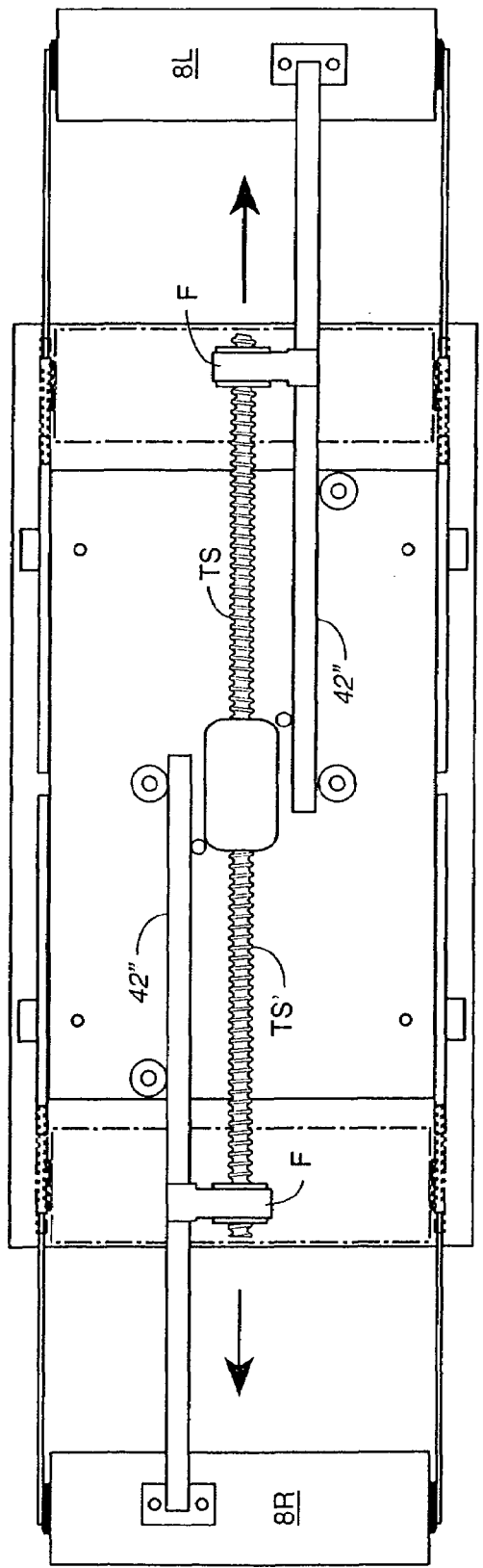
FIG._4J

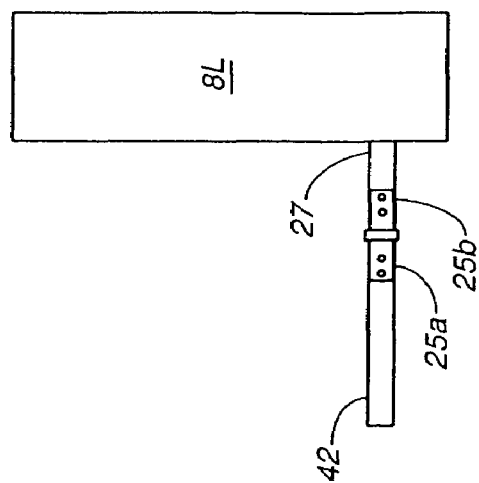
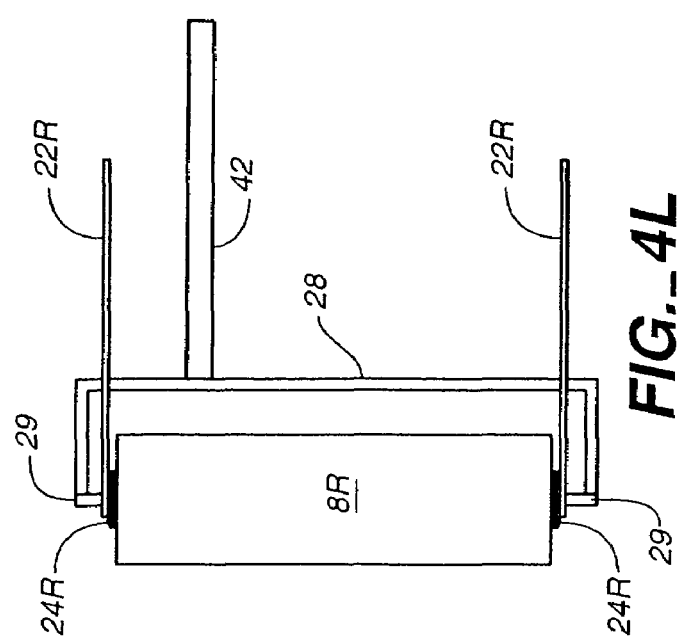

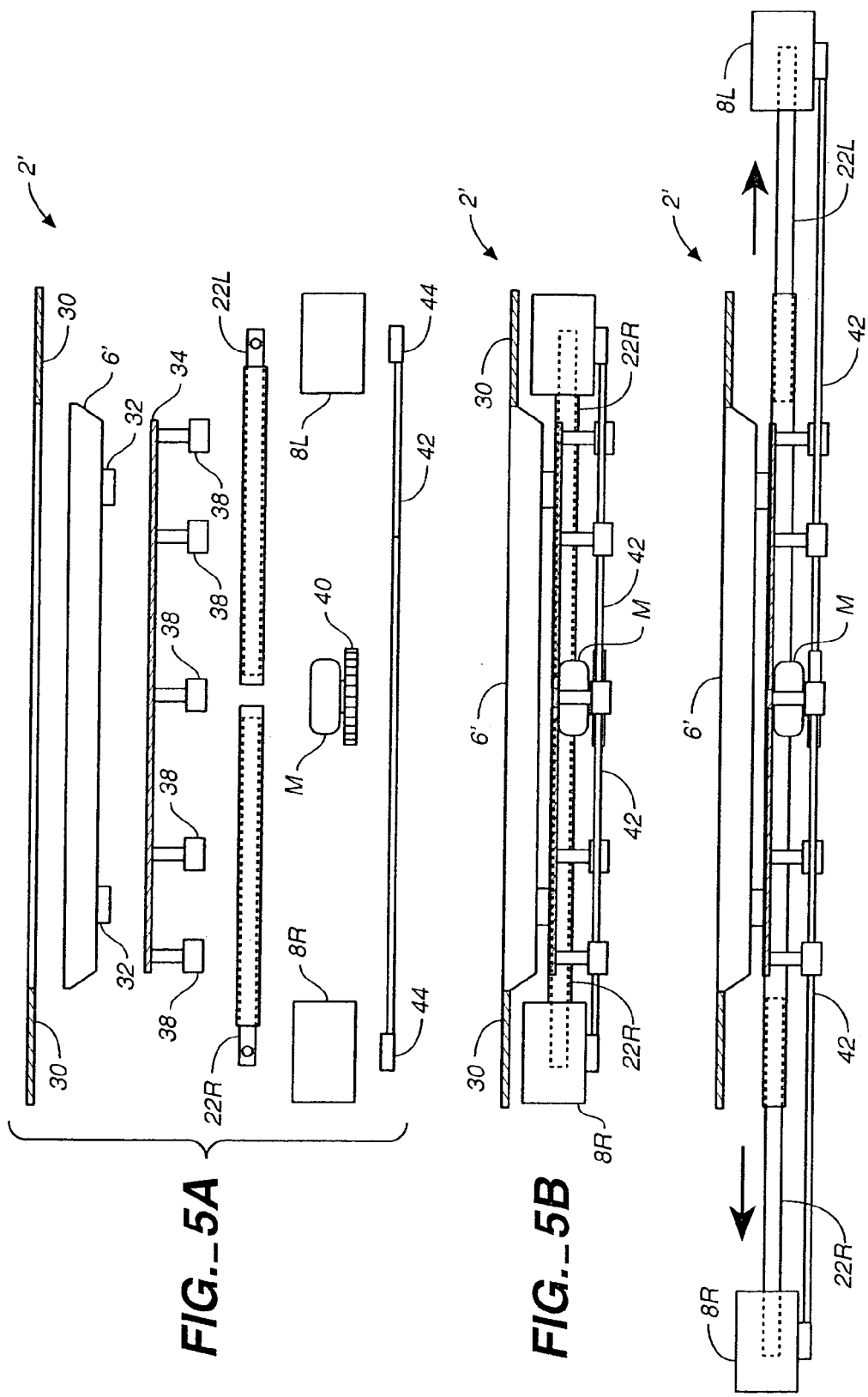

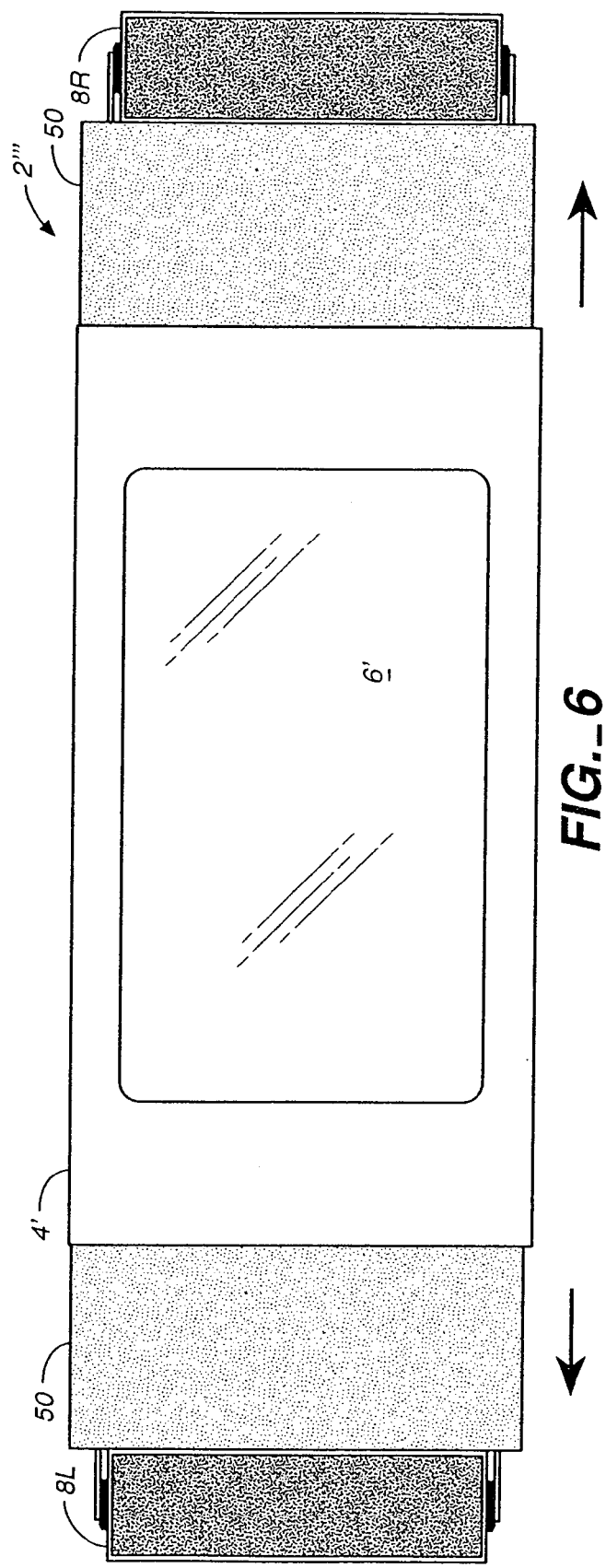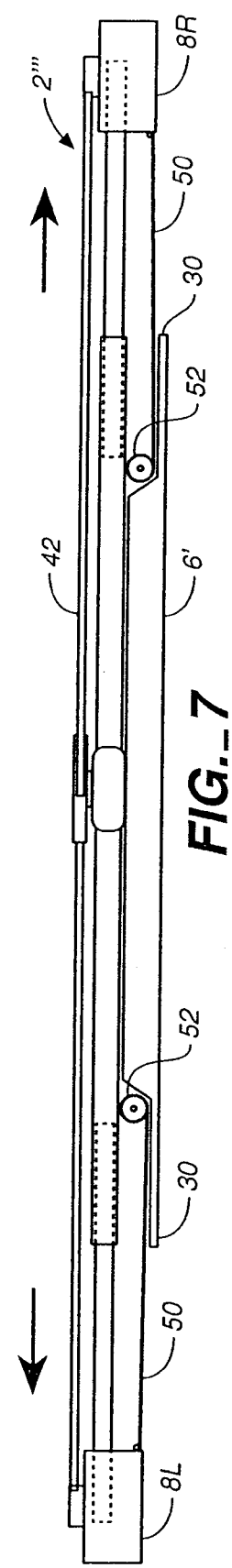

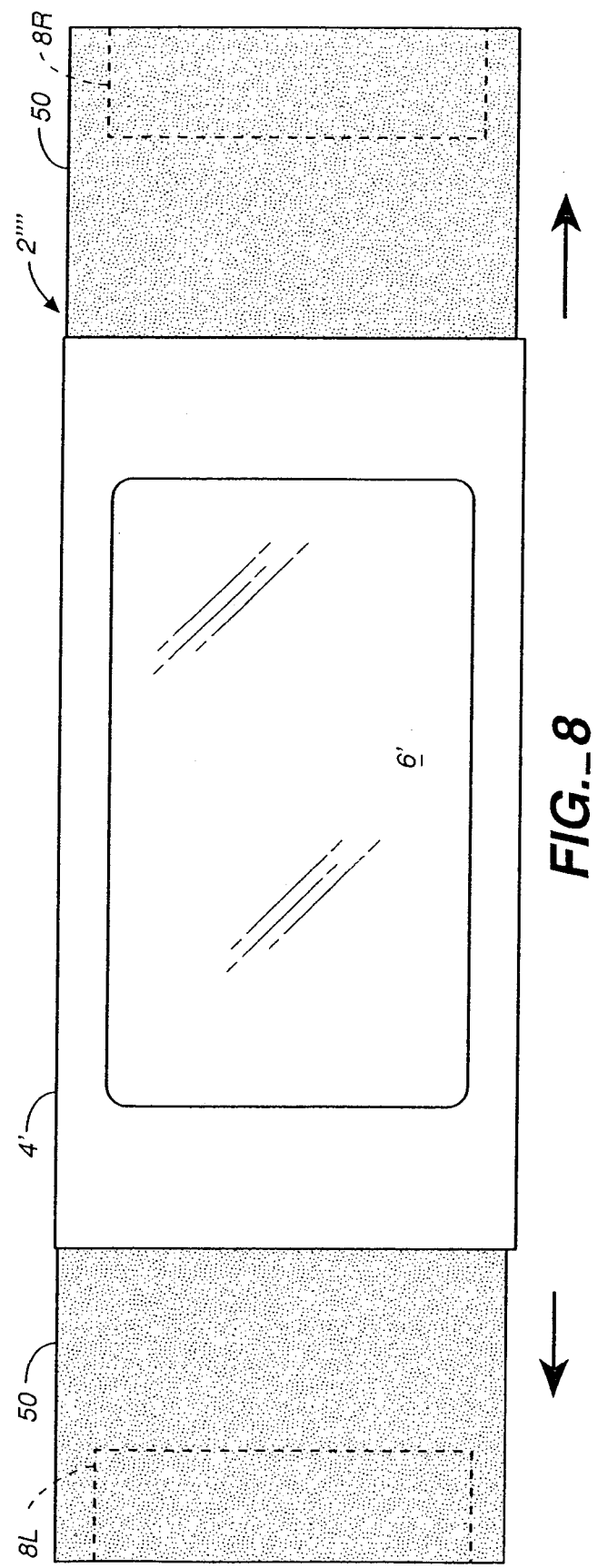
FIG._8

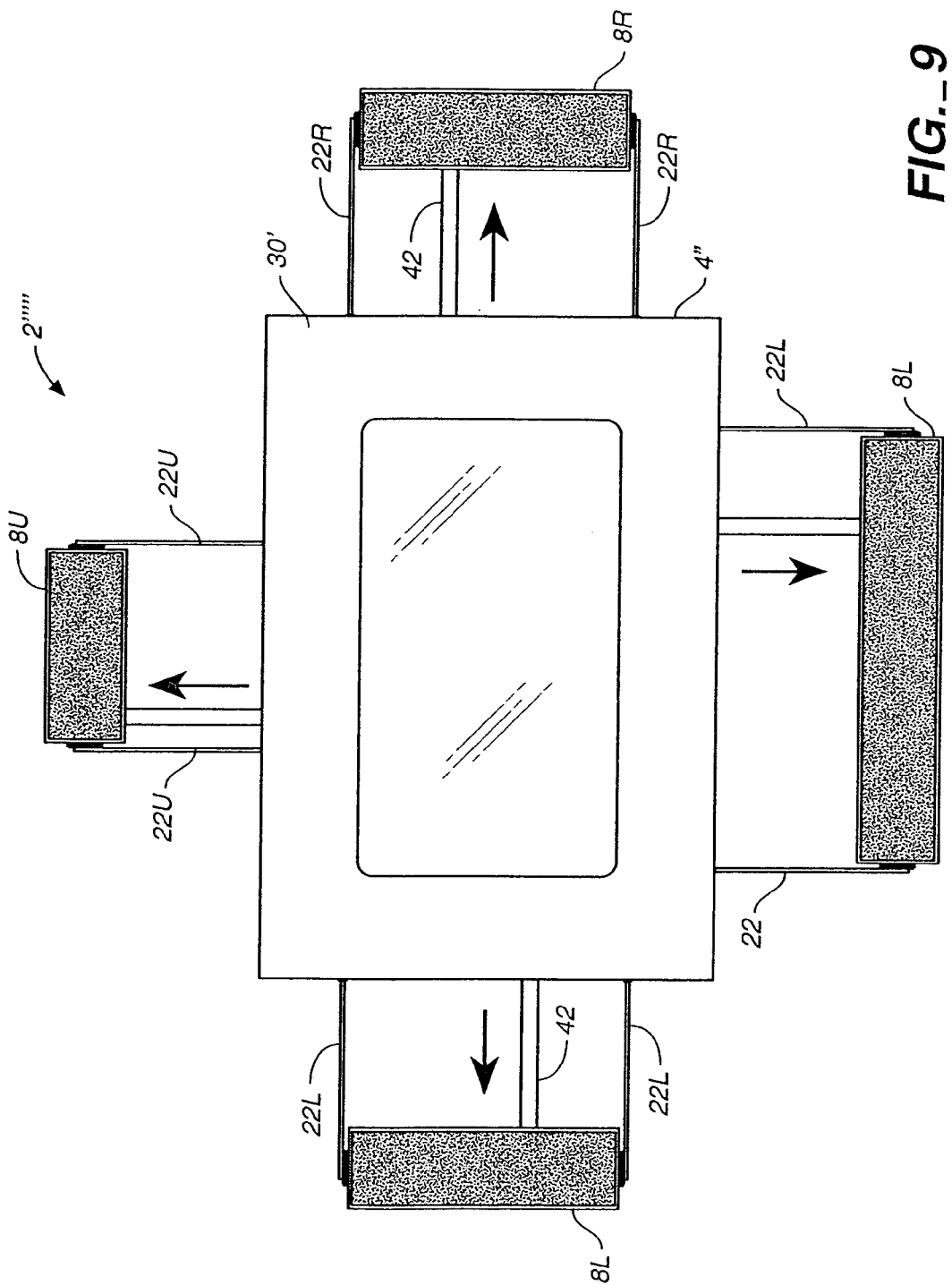
FIG._9

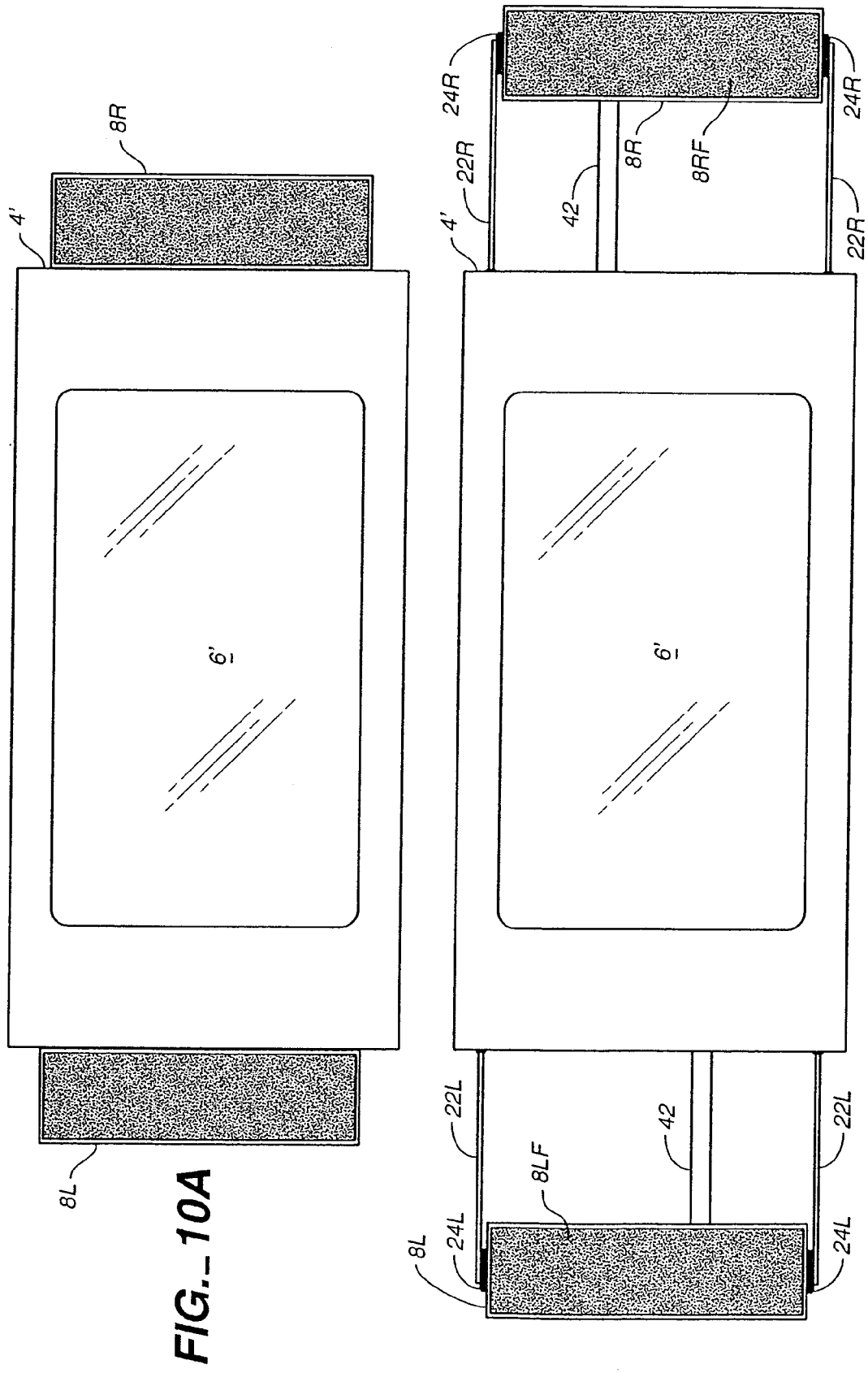

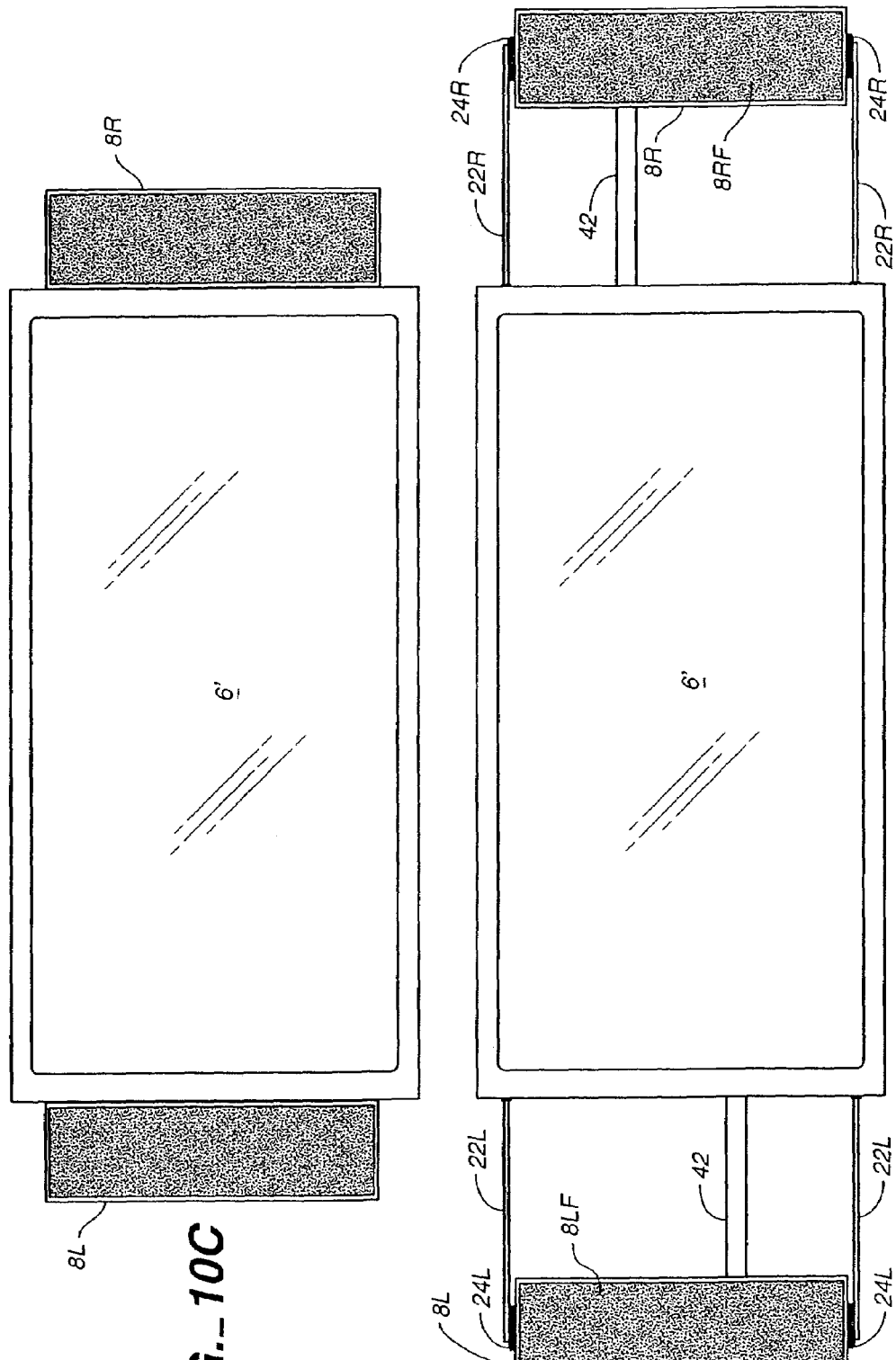
FIG._10C
FIG._10D

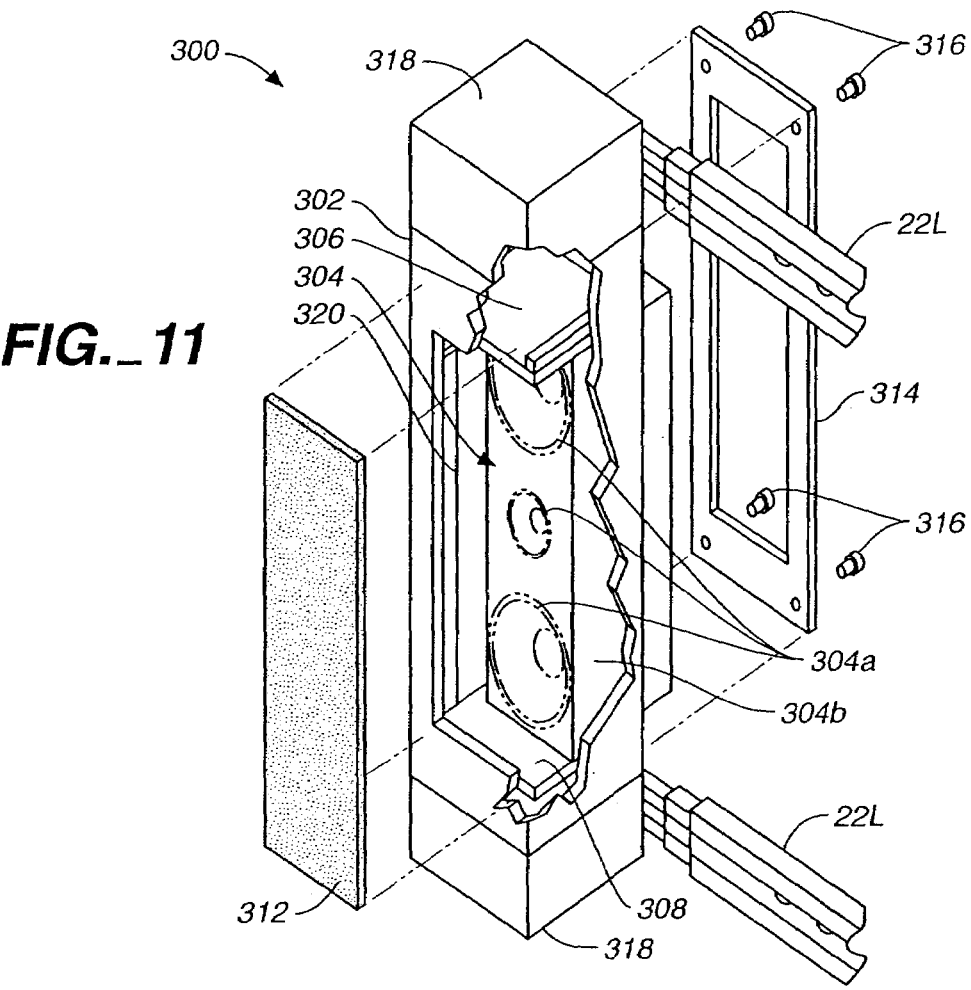

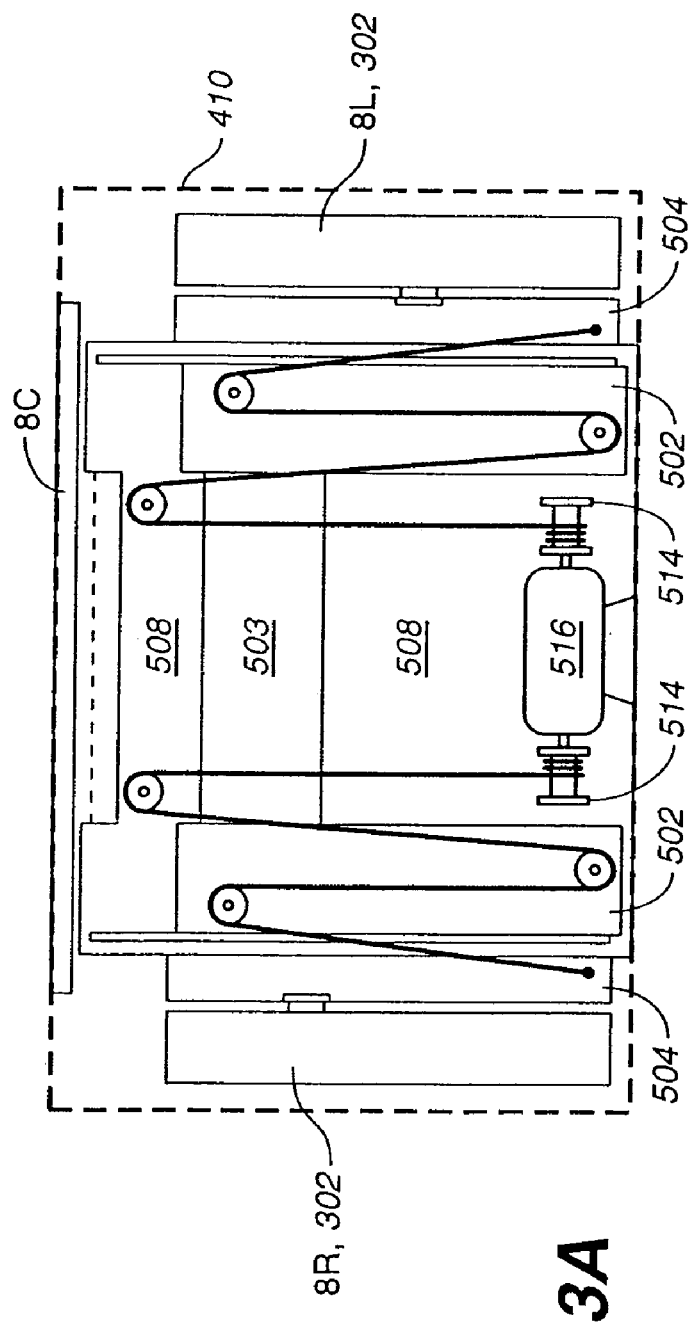
FIG. _13A

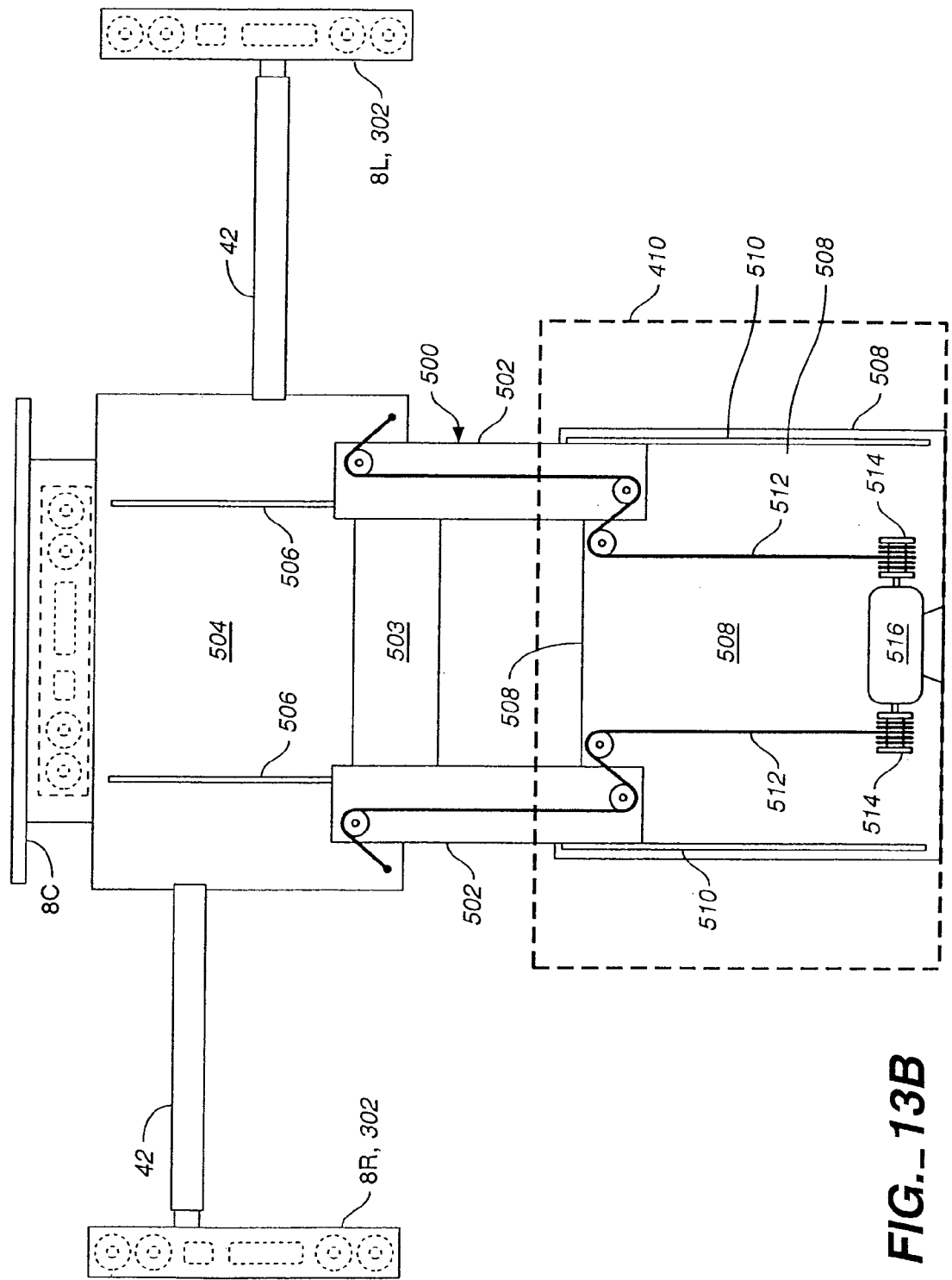
FIG._13B

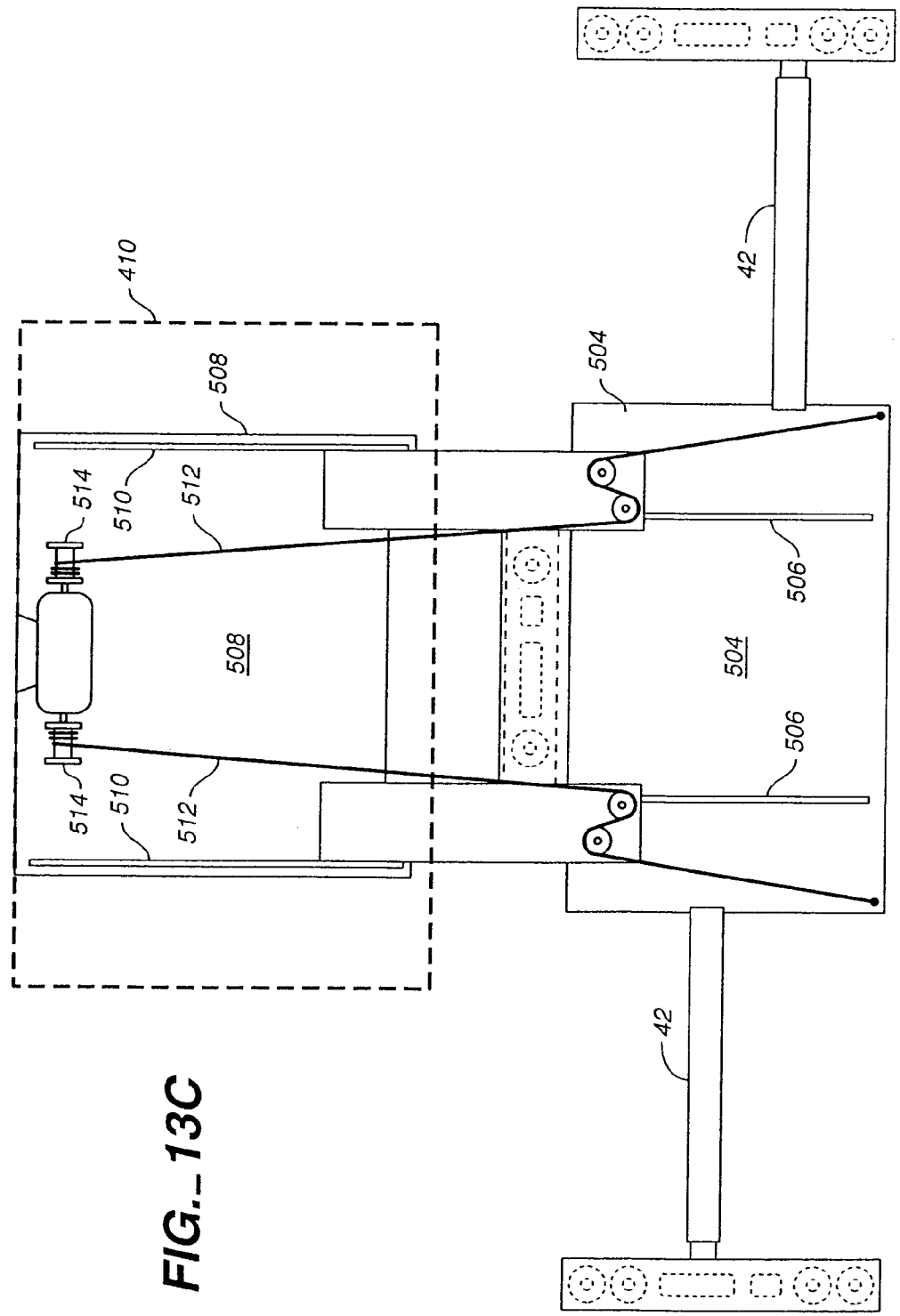
FIG._13C

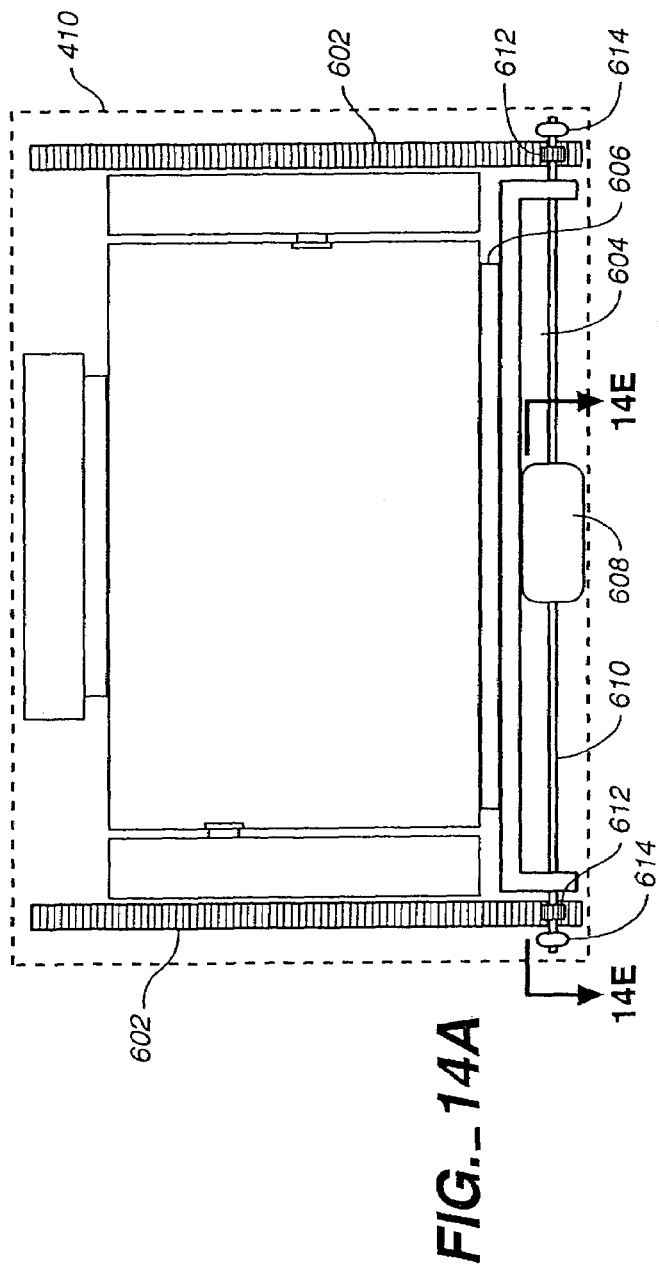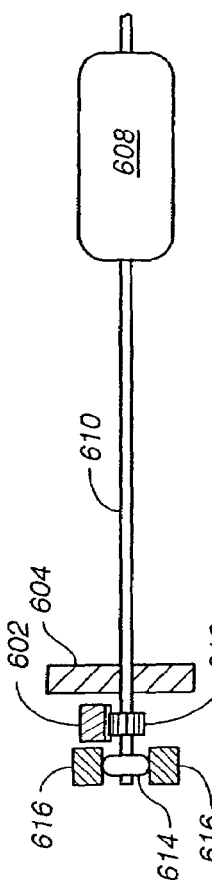

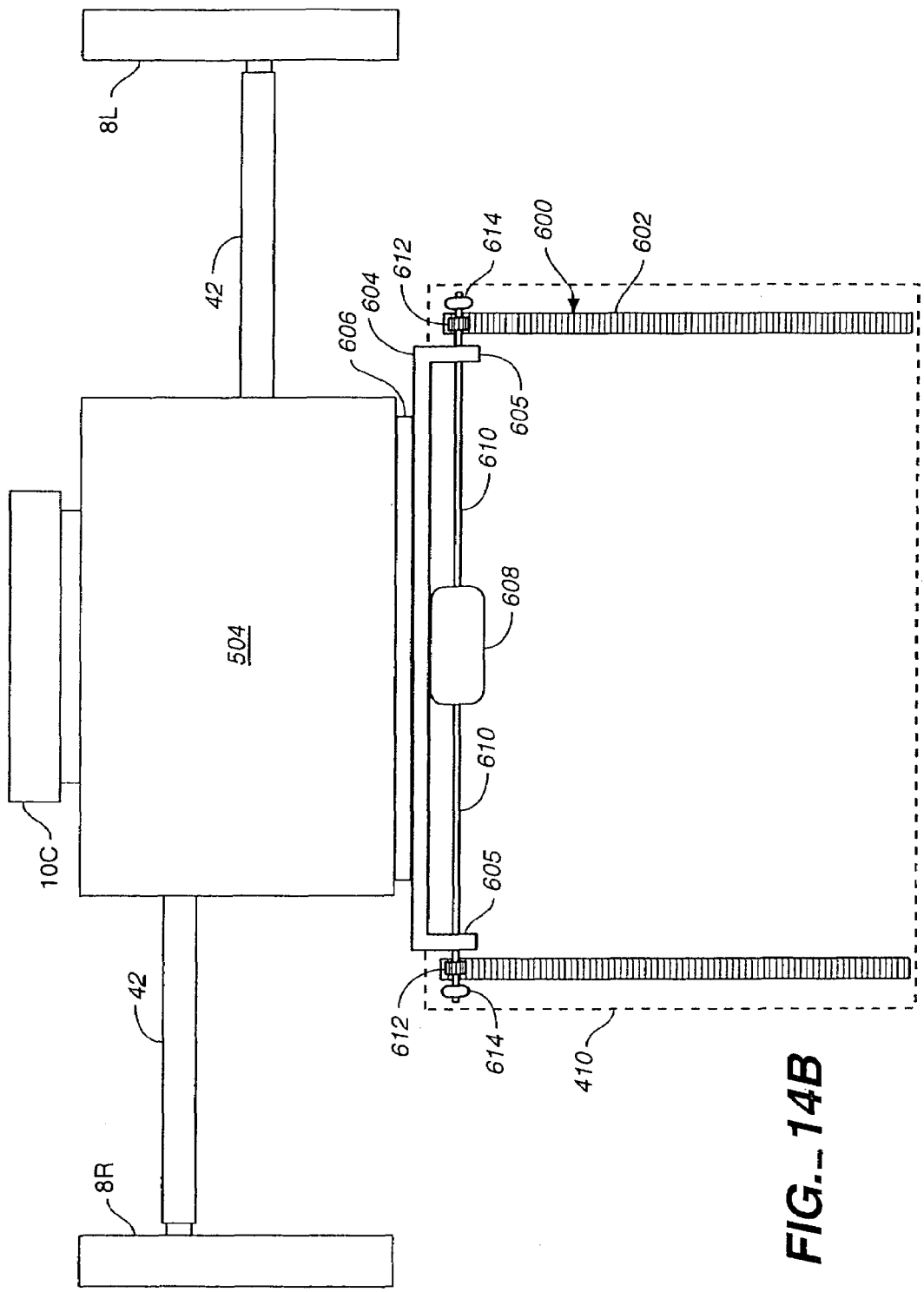
FIG._14B

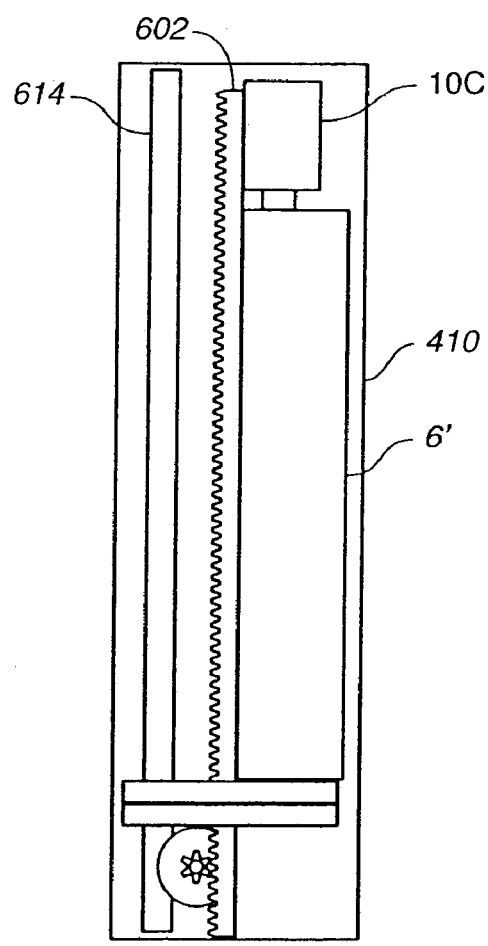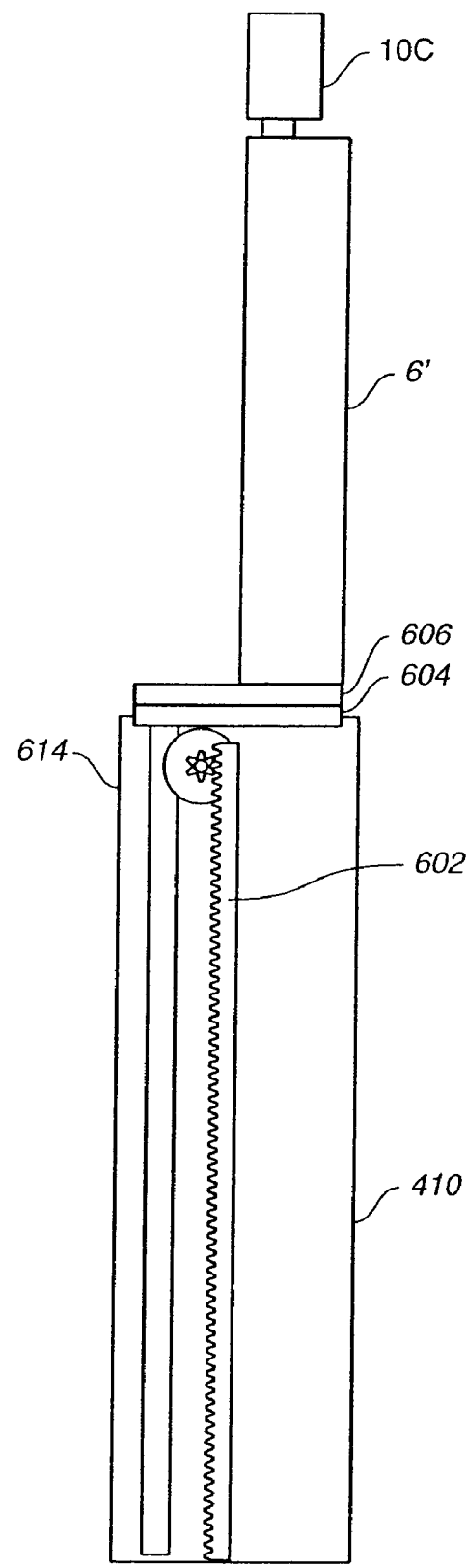
FIG._14C   FIG._14D

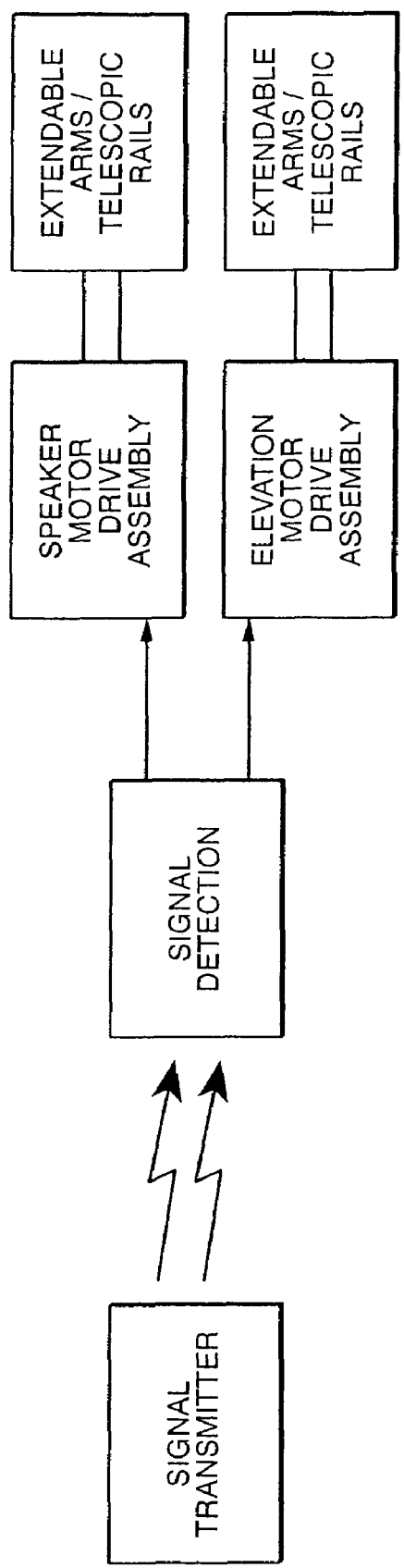
FIG._15

AUDIO VISUAL SYSTEM

RELATED APPLICATIONS

This application is a Continuation-In-Part Application of a prior filed application having Ser. No. 10/713,901 and filing date of Sep. 17, 2003 now abandoned and entitled: Audio Visual System and Apparatus.

FIELD OF THE INVENTION

This invention relates to furniture, and more particularly to audio visual systems that can be used in a home or an office environment. For example, the audio visual system can be an entertainment center.

BACKGROUND OF THE INVENTION

Entertainment centers are one type of audio visual system that typically include a plurality of audio visual components including any number or all of the following: a television, speakers, a receiver, a VCR, a CD player, a DVD player, a personal video recorder (PVR), and TIVO type products. These systems have been available in a variety of sizes, shapes, and styles. For example, a television, receiver, VCR, and CD and DVD players can be housed in a cabinet having additional shelves and/or drawers to store other items such as books, remote controls, video recordings, CDs, and DVDs. Some entertainment centers are open in the front, while others have doors that conceal some or all of the components from view.

There remains a need to improve audio visual or home entertainment systems to be more suitable for space-limited environments in the office or home where, for example, there may not be the desired amount of room for floor standing speakers. Also, there is a need to provide systems that provide space saving storage for speakers.

SUMMARY OF THE INVENTION

The present invention involves improvements in audio visual systems and avoids disadvantages of the prior art. Among the many advantages of the invention is it can provide an audio visual system in a compact space.

In one embodiment, an audio visual system is provided comprising a housing, a video display, at least one speaker support coupled to at least one of the display and the housing, and at least one speaker mounted to and supported by the speaker support, the housing and the at least one speaker each having a front wall, the display and the at least one speaker support being movable from a first state, where the display and the at least one speaker, which is in a first position, are in the housing and hidden from view when viewing the front wall of the housing, to a second state, where the display and the at least one speaker are spaced from the housing and at least partially unobstructed thereby with the at least one speaker being in a second position differently spaced from the display than when in the first position. Among the many advantages of the invention is that the video display and speakers can be hidden from view when the system is not in use.

An audio visual system comprising a housing, a video display, at least one speaker box support coupled to at least one of the display and the housing, and at least one speaker box adapted to receive another speaker box, the at least one speaker box being mounted to and supported by the speaker box support, the housing and the at least one speaker box each having a front portion, the display and the at least one speaker box support being movable from a first state, where the display and the at least one speaker box, which is in a first position relative to the display, are in the housing and hidden from view when viewing the front portion of the housing, to a second state, where the display and the at least one speaker box are spaced from the housing and at least partially unobstructed thereby with the at least one speaker box being in a second position differently spaced from the display than when in the first position.

The above is a brief description of some deficiencies in the prior art and advantages of the present invention. Other features, advantages, and embodiments of the invention will be apparent to those skilled in the art from the following description, accompanying drawings, wherein, for purposes of illustration only, specific forms of the invention are set forth in detail.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIGS. 1A–C diagrammatically illustrate one embodiment of an audio visual system constructed in accordance with the principles of the present invention where FIG. 1A illustrates a video display and speaker system in a retracted state in a housing and hidden from view; FIG. 1B illustrates the embodiment of FIG. 1A with the video display and speaker system extended from the housing; and FIG. 1C illustrates the embodiment of FIG. 1A as depicted in FIG. 1B with the speakers in a laterally extended state;

FIGS. 2A and 2B diagrammatically another embodiment of the invention where FIG. 2A illustrates a video display and speaker system extended or lowered from a housing and the speakers laterally extended; and FIG. 2B illustrates the embodiment of FIG. 2A with the speakers retracted and the video display and speaker system ready to return into the housing;

FIG. 3A is a front elevational view of one video display and speaker system suitable for use in the embodiment illustrated in any of FIGS. 1A–C or 2A & B with the speakers hidden from view and in a retracted state;

FIG. 3B is a front elevational view of the embodiment illustrated in FIG. 3A with the speakers in an extended state;

FIG. 4A is a rear elevational view of the embodiment illustrated in FIG. 3A with the speakers in the retracted state shown in FIG. 3A;

FIG. 4B is a rear elevational view of the embodiment illustrated in FIG. 3A with the speakers in the extended state shown in FIG. 3B;

FIG. 4C is a variation of the speaker drive mechanism shown in FIG. 4A with the speakers in the retracted state;

FIG. 4D illustrates the speaker drive mechanism embodiment of FIG. 4C with the speakers in the extended state;

FIG. 4E is a variation of the speaker drive mechanism of FIG. 4C with the speakers in a retracted state;

FIG. 4F illustrates the speaker drive mechanism embodiment of FIG. 4E with the speakers in an extended state;

FIG. 4G illustrates another drive mechanism suitable for use with any of the video display and speaker systems described herein and in a retracted state;

FIG. 4H illustrates the drive mechanism embodiment of FIG. 4G with the speakers in an extended state;

FIG. 4I illustrates another drive mechanism suitable for use with any of the video display and speaker systems described herein and in a retracted state;

FIG. 4J illustrates the drive mechanism embodiment of FIG. 4I with the speakers in an extended state;

FIG. 4L illustrates a speaker pivot arrangement;

FIG. 4K illustrates another speaker pivot arrangement;

FIG. 5A is an exploded view of the system illustrated in FIG. 3A;

FIG. 5B is a top sectional view taken along line 5B—5B of FIG. 4A;

FIG. 5C is a sectional view taken along line 5C—5C of FIG. 4B;

FIG. 6 is a front elevational view of a variation of the embodiment shown in FIGS. 3A and 3B with roller screens secured to the inner surface of each speaker;

FIG. 7 is a top sectional view of the embodiment shown in FIG. 6;

FIG. 8 is a front elevational view of a variation of the embodiment shown in FIG. 6 with roller screens secured to the outer surface of each speaker;

FIG. 9 is a further variation of the embodiment of FIG. 3A with speakers extendable in lateral and vertical directions;

FIGS. 10A and B illustrate a further variation of the embodiment shown in FIGS. 3A and 3B where FIG. 10A shows the speakers in view when in the retracted state and FIG. 10B shows the speakers in an extended state;

FIGS. 10C and 10D illustrate a variation of the embodiment of FIGS. 10A and B;

FIG. 11 is a perspective partial sectional view of modular speaker system in accordance with another aspect of the invention;

FIG. 12A is a front elevational view of the speaker system of FIG. 11 with the front panel removed and illustrating the system housing a speaker; and FIG. 12B is a front elevational view of the speaker system of FIG. 11 with the front panel removed and illustrating the system housing a speaker having a configuration different than that shown in FIG. 12A.

FIG. 13A is a rear elevational view of one embodiment of the system of FIGS. 1A–C illustrating one embodiment of a lift mechanism in combination with the system of FIGS. 1A–C with the lift mechanism in a retracted state;

FIG. 13B illustrates the embodiment of FIG. 13A with the lift mechanism in an extended state and the speakers spaced from the video display;

FIG. 13C illustrates another embodiment of a lift mechanism in combination with the system of FIGS. 2A and B with the lift mechanism in an extended state and the speakers spaced from the video display;

FIG. 14A is a rear elevational view of another embodiment of the system of FIGS. 1A–C illustrating another embodiment of a lift mechanism in combination with the system of FIGS. 1A–C with the lift mechanism in a retracted state;

FIG. 14B illustrates the embodiment of FIG. 14A with the lift mechanism in an extended state with the speakers spaced from the video display;

FIG. 14C is a side view of the lift mechanism illustrated in FIG. 14A;

FIG. 14D is a side view of the lift mechanism illustrated in FIG. 14B;

FIG. 14E is a sectional view a portion of FIG. 14A taken along line 14E—14E in FIG. 14A; and FIG. 15 is a block diagram of a remote control system for actuating motors for any of the lift mechanisms or speaker drive assemblies described herein.

DETAILED DESCRIPTION OF THE INVENTION

Before the present invention is described, it is to be understood that this invention is not limited to particular embodiments or examples described, as such may, of course, vary. The embodiments described herein are provided for purposes of example and are not intended to limit the invention.

The present invention generally involves a home entertainment center or audio visual system having a movable video display and speaker system, which can comprise a video display and one or more speakers, a video display and one or more speaker boxes, or any combination thereof. According to one embodiment of the invention, the video display and at least one speaker or speaker box are movable from a position in a housing or cabinet to a position out of the housing or cabinet. The at least one speaker or speaker box also is movable away from the video display.

Referring to the drawings wherein like numerals indicate like elements, one example of an audio visual system in the form of an entertainment center is shown in FIG. 1A and generally indicated with reference numeral 400. Audio visual system 400 includes a housing or cabinet 410, a video display and speaker system 2, which has a video display 6' and left and right speakers 8L,R or speaker boxes 302, and a mechanism for extending the video display and speaker system 2 from and/or moving the video display and speaker system into housing 410. The mechanism is diagrammatically shown in FIGS. 1B and 1C between housing 410 and video display and speaker system 2.

Any of the video display and speaker systems described herein can be incorporated into audio visual system 400. Accordingly, video display 6' can be a flat panel video display in the form of a television, such as a plasma, liquid crystal or high definition television, or it can be in another form, such as a flat panel monitor or a projection screen. Further, video display and speaker system 6' can include a center speaker 8C as an option as will be described in more detail below. The video display and speaker system can include extensible or telescoping arms 22L, 22R, drive arms 42, or any combination thereof to move the speakers away form and/or toward video display 6'. For example, the system can use only extensible arms 22L & R. Alternatively, it can use only drive arms 42. In a further example, it can use both extensible arms 22L & R and drive arms 42 all of which will be described in more detail below.

Housing or cabinet 410 can be in the form of a stand-alone cabinet. Alternatively, housing or cabinet 410 can be pedestal or wall mounted. It also can be hung as will be described in more detail in connection with FIGS. 2A and B.

Returning to FIG. 1A, audio visual system 400 is shown with video display and speaker system 2 in a first state where the display and speaker system are in housing or cabinet 410 and hidden from view. FIG. 1B shows the display and speakers in another state where they are extended or elevated from housing or cabinet 410. In this state right speakers 8L and 8R or speaker boxes 302 and the optional center channel speaker 10 are exposed or in view. In this state for example, the video display and speakers can be moved to a further state where the left and right speakers 8L and 8R or speaker boxes 302 are extended out from display 6' by a desired distance via extensible members or telescopic rails 22L & R and/or drive arms 42. The extended and exposed speakers provide enhanced stereophonic sound reproduction or acoustic quality, which is especially desirable, when viewing programs that support multi-channel audio effects. This configuration provides most if not all one needs to enjoy the latest DVD movie or programming where the audio is being transmitted in a surround sound format. Accordingly, the system is well suited for space-limited room environments where there is really no or little room for floor standing speakers. When each speaker 8L and 8R or speaker box 302 is spaced the same distance from the display 6', it is possible to optimize the stereophonic effect. Phantom rear speakers can be incorporated into the speaker boxes in any of the embodiments described herein to provide rear channel audio effects.

As noted above, the extensible arms provide a simple mechanism to spread out the sound field. They also facilitate returning the speakers to a position for placement in the housing or cabinet with the video display. Not only does the hidden aspect of the video display and speaker system improve the appearance of the audio visual system when not in use, the hidden aspect can provide protection for the speakers and display. First, the housing can provide dust protection for the speakers and/or display. Further, the portion of the housing or cabinet behind which the speakers and display are disposed can be constructed to prevent or minimize the possibility of sharp objects or fluids, such as cleaning fluids, from passing therethrough, and to the display or through the speaker covers, and into the speaker component(s) such as the speaker cone. Otherwise such sharp objects or fluids could damage the speakers and/or display and cause deterioration of the speaker's sound reproductive quality. The portion of the housing in front of the speakers also can be constructed of suitable material to protect the speakers from pets and potential clawing of the speaker fabric, which can result in tearing the fabric and then damage to the speaker components.

Referring to FIGS. 2A and 2C, a variation of the embodiment of FIG. 1A is shown where video display and speaker system is lowered form housing 410 in accordance with another embodiment of the invention. In his configuration, housing 410 can be mounted to or in a ceiling or other structure from which it can be lowered.

Referring to the video display and speaker system shown in FIGS. 3A and 3B and generally designated with reference numeral 2', the aforementioned extensible arm or telescoping arms will be described In this example, speakers 8L and 8R are mounted to speaker supports, which comprise extensible or telescoping arms 22L and 22R, respectively. The telescoping arms are of conventional construction where each can have two segments or members, one slidably disposed within the other as shown in FIG. 4A (which is a rear view of the video display and speaker system of FIG. 3A), or more than two segments or members. Thus, for example, three segments can be used. One segment can be fixed or secured to an inner portion of visual display and speaker system as shown in FIG. 4A. The fixed segment can be hidden from view with the remaining segment being extendable therefrom, one slidably disposed in the other such as shown in FIG. 4A.

Although one telescoping configuration has been shown, it should be understood that other telescoping configurations can be used in any of the embodiments described herein. For example, one telescoping member can be slidably mounted to an exterior surface of the other member with which it cooperates. Further, the telescoping arms or members can be constructed so that the speakers, when mounted to the ends thereof can be sufficiently spaced from the video display or housing 410 to provide the desired effect. The distance depends on the desired effect or the space available.

The ends of the telescoping arms can be fixedly secured to speakers 8L and 8R so as to preclude relative movement therebetween. Alternatively, the ends of the telescoping arms can be provided with or coupled to speaker supports 24L and 24R that are rotatably mounted to the arms so that speakers 8L and 8R can be rotated to provide additional sound adjustment. Each rotating support can comprise a disc mounted to a bearing, which is secured to the end of an arm with a pin that is secured in the center bore of the bearing or with other fastening means. Commercially available turntables or swivel bearings also can be used. One example is a 4 inch TM4C swivel bearing provided by Triangle Manufacturing Company of Oshkosh, Wis.

Although one example of an extensible speaker support is illustrated in FIG. 2A, it should be understood that other extensible members or supports can be used in any of the embodiments described herein. Examples of other extensible speaker supports include but are not limited to sliding members such as rails or pins that are coupled or fixedly secured to the speakers and slidably mounted to another member coupled or fixedly secured to the display housing or cabinet.

As in any of the embodiments described herein, speaker wires can extend from the audio component in the display housing or cabinet to the speakers with sufficient slack to allow full speaker extension.

Returning to FIGS. 3A and B, 4A and B, and 5A–C, one video display and speaker system incorporating a flat panel video display is shown. Audio visual system 2' includes a housing 4', which houses a flat panel video display 6' and/or forms a frame for the flat panel video display 6'. Flat panel video display 6' can be in the form of a television, such as a plasma, liquid crystal or high definition television, or it can be in another form, such as a flat panel monitor or a projection screen. The housing further houses or supports left and right speakers 8L and 8R, each having a front 8LF and 8RF, respectively.

FIG. 3A shows the front of the audio visual system 2' in a first state where the left and right speakers 8L and 8R are disposed behind portions of the housing and hidden from view when viewing the system from the front. FIG. 3B illustrates the audio visual system 2' in a second state where the left and right speakers 8L and 8R are extended out from the housing by a desired distance via telescopic rails 22L and 22R. Required receivers and components for the flat panel display and speakers can be mounted on the housing or placed in a separate housing that can be wall or floor mounted.

Referring to FIGS. 4A and 4B, speakers 8L and 8R are mounted to speaker supports or telescoping arms 22L and 22R, respectively, in the same manner as described above in connection with audio visual system 2. Thus, rotatable speaker supports or swivels as described in connection with the foregoing embodiment and indicated with reference characters 24L and 24R also can be used. However, the manner in which the telescoping arms are secured to the housing differs in the illustrative example. Further, a drive mechanism can be provided to move the speakers as will be described in more detail below.

Referring to FIGS. 5A–C, housing 4' comprises frame or bezel 30, mounting strips 32, and support plate or bracket 34. Bezel 30 is secured to video display 6' by conventional means and can be part of a commercially available assembly comprising a flat panel video display with a bezel or frame. Mounting strips 32 are secured to the back of video display panel 6' with conventional fastening means. Strips 32 come installed on some commercially available flat panel displays.

Strips 32 are provided with threaded holes or other fastening means to secure the display to support plate or bracket 34. In the illustrative embodiment, fasteners 36, which can be screws, are shown securing support plate or bracket 34 to mounting strips 32 (FIGS. 4A and 4B). The outer telescoping arm segment of each telescoping arm pair 22L and 22R is secured to the bracket with glue or fasteners or other means known to those of ordinary skill in the art. Although one bracket assembly configuration has been shown other configurations can be used as well. For example, the bezel can be secured to plate or bracket 34 as opposed to being directly secured to video display 6'.

Any of the audio visual system embodiments described herein can include a drive to move the speakers synchronously or independently of one another. The audio visual system in any of the embodiments can include a rack and gear drive as shown in FIGS. 4A and 4B, which can be configured to have either speaker move the same distance as the other when one of the speakers is pulled laterally outward to the position shown in FIG. 4B or pushed laterally inward to the position shown in FIG. 4A. With such a configuration, the speakers remain spaced the same distance from the housing when either one is pulled or pushed laterally. This provides a predetermined balancing of the speakers relative to the housing and can provide the desired acoustic results with minimal effort. According to the illustrative embodiment shown in FIGS. 4A and 4B, the drive comprises toothed arms or racks 42, each having an end secured to one of the speakers 8L or 8R via a bracket 44 or other suitable means, and its toothed portion meshing with gear wheel or pinion 40, which is rotatably mounted or coupled to bracket 34. The end of each arm 42 that is secured to a respective speaker can be mounted thereto with conventional hardware to pivotally couple the end of the arm to the speaker and allow speaker rotation if desired. Such hardware can be provided on the rear of the speaker or the side of the speaker facing the display. For example, a conventional hinge having a pair of mating hinge plates and a pin pivotally coupling the plates can be used. One hinge plate can extend from the end of arm 42 to be secured or coupled to the speaker and the other hinge plate can be secured to the speaker side facing the display. One such arrangement is shown in FIG. 4L, where one end of hinge plate 25a is coupled to one end of arm 42 and the other end of hinge plate 25a is pivotally coupled to one end of hinge plate 25b through a conventional hinge pin arrangement such as used in door hinges, for example. The other end of hinge plate 25b is coupled to speaker 8L (or 8R) through bracket 27, which is secured to the back or side of the speaker in a conventional manner as is known in the art. In another arrangement illustrated in FIG. 4K, a C-shaped bracket 28 can be coupled or fixed to the end of arm 42 and its end portions 29 mounted to the arms 22R (or 22L) without interfering with the rotatable coupling between the arms and swivel plates 24R (or 24L). As noted above, any of the embodiments described herein can incorporate any of the foregoing pivotal couplings between arms 42 and the speakers. It should be understood, however, that such hardware and/or speaker rotation is optional.

A plurality of tracking rollers 38 also can be rotatably mounted to bracket 34 to support and/or guide toothed arms or racks 42. As a further option, a motor or drive (e.g., a thin or pancake style motor) can be mounted to bracket 34 and gear wheel 40 coupled thereto to provide a power driven speaker drive mechanism.

As described above, the drive mechanism can be configured to move the speakers independently of one another.

Referring to FIGS. 4C and 4D, audio visual system 2" is shown, which as noted above, includes a drive that can be incorporated into any of the embodiments described herein. Audio visual system 2" is the same as audio visual system 2' with the exception that it incorporates an alternative drive configuration, which can drive or displace one speaker independently of the other. In this case, two gear wheels or pinions 40 are rotatably coupled to bracket 34, one for each toothed arm or rack 42. A motor also can be provided as described above to provide a power driven speaker drive mechanism. In this manner, a motor can be provided for each gear wheel to independently power each gear wheel. With this arrangement. One can actuate one motor to move one speaker, while allowing the other speaker position to remain unchanged. Alternatively, one can actuate both motors to move one speaker inwardly and the other outwardly. Variable speed motors also can be used so that speakers can be moved at different rates of speeds.

Referring to FIGS. 4E and 4F, a variation of system 2" FIGS. 4E and 4F is shown and generally designated with reference numeral 2"a. System 2'a, which also can be incorporated into any of the embodiments described herein, is the same as that shown in FIGS. 4C and D with the exception that it incorporates an alternative drive configuration where gear wheels 40 are moved outwardly toward the speakers and the toothed part of arms 40 are moved therewith. This can be especially advantageous when mounting the system to a pedestal.

Referring to FIGS. 4G and 4H, another variation of system 2" FIGS. 4C and 4D is shown and generally. This video display and speaker system, which also can be incorporated into any of the embodiments described herein, is the same as that shown in FIGS. 4C and D with the exception that it replaces arms gears 40 and arms 42 with worm gears 40' and cooperating screw arms 42'. The motors coupled to the worm gears move the speakers inwardly or outwardly.

Referring to FIGS. 4I and 4J, a variation of the system of FIGS. 4G and 4H is shown. This embodiment is the same as that shown in FIGS. 4G and 4H with the exception of the speaker drive system. In this embodiment, two threaded shafts TS of opposite hand extend from one motor. Each shaft is coupled to a conventional follower F, which is prevented from rotation. Follower F is internally threaded and configured so that when the motor and threaded shafts TS are rotated clockwise or counterclockwise follower F moves inwardly or outwardly with speaker drive arms 42" to which it is attached.

Although various embodiments described herein are shown with drive mechanisms, which can be interchanged among any of the embodiments described herein, it should be understood that they need not include such mechanisms. Further, other drives than those shown can be used. For example, motorized spiral gear or auger type drives or belt drives can be used in lieu of the illustrated rack and pinion drive to move the speakers outwardly or inwardly. Such drives also can be configured to move the speakers synchronously or independently of one another as described above.

Referring to FIGS. 6 and 7, a further audio visual system is shown and generally indicated with reference numeral 2'''. Audio visual system 2''' is the same as audio visual system 2' or 2" with the exception that audio visual system 2''' further includes two screens 50 that cover at least a portion of the telescoping arms, and toothed arms or racks if included, and can also cover speaker wires or any other components between the speakers and the video display housing. Each screen is coupled to a spring loaded roller 52 that is mounted to bezel or frame 30. Each uncoiled end of each screen is secured to an inner wall surface of one of speakers 8L and 8R so that the screens are carried with the speakers when the speakers are laterally extended. When the speakers are retracted to a position behind the bezel, the spring loaded rollers rewind the screen therearound. Screens 50 can comprise any suitable material including opaque, translucent or transparent materials. The material may have various patterns or designs including, but not limited to, solid, striped, or repeated circle designs. It can have artwork, pictures or prints incorporated therein or thereon. When it is desirable to completely hide the telescoping arms, racks 42, and or speakers, opaque materials generally are preferred. Although a rolling screen configuration has been illustrated, it should be understood that other screen configurations can be used. Other screen configurations include but are not limited to, for example, accordion configured screens. The accordion configuration facilitates expansion and contraction to provide the desired coverage of components.

Referring to FIG. 8, another audio visual system 2'''' is shown. Audio visual system 2'''' is the same as audio visual system 2''' with the exception that in audio visual system 2'''' the uncoiled ends of the screens are secured to the outer surface of the speakers to entirely cover the speakers, telescoping arms, and the optional rack and gear drive mechanisms described above.

Referring to FIG. 9, a further embodiment is shown and generally indicated with reference numeral 2'''''. Audio visual system 2''''' is the same as Audio visual system 2'''' with the exception that upper and lower speakers 8U and 8L and telescoping arms 22U and 22L are provided and bezel 30' is enlarged on the upper and lower sides to accommodate hiding upper and lower speakers 8U and 8L therebehind. The drive mechanisms described above also can be incorporated into this embodiment where the desired number of gears can be used to move toothed arms or racks 42. For example, the lateral drive mechanism can be a one or two gear system as described above in connection with FIGS. 4A–D. The vertical drive system also can incorporate the single or dual gear drive system and any combination of the mentioned lateral and vertical drive systems can be used. Further, screening can be provided as shown in FIGS. 6–8.

FIGS. 10A and 10B illustrate a further embodiment, which is the same as system 2' as shown in FIGS. 3A and 3B with the exception that the extensible or telescoping arms are configured so that the speakers remain in view when in the retracted state. For example, the length of the toothed portion measured from the free end of each extensible arm can be shortened to reduce the distance that the each speaker moves. As is the case with system 2', the bracket assembly of FIGS. 5A–C and/or any of the drive mechanisms described above (e.g., the drive mechanisms shown in FIGS. 4A–C) or screen arrangements described herein and illustrated in FIGS. 6–9 can be incorporated into this embodiment. The embodiment illustrated in FIGS. 10C and 10D is the same as that shown in FIGS. 10A and 10B with the exception that it does not include frame or bezel 30 around the flat panel or plasma display. Otherwise this embodiment, like the embodiment of FIG. 10A and 10B, can include the bracket assembly illustrated in FIGS. 5A–C and any of the aforementioned drives, screens and related mechanisms. A mounting bracket can be secured to plate or bracket 34 when used to facilitate wall or pedestal mounting or mounting the display in a cabinet.

According to another embodiment, a modular speaker system is provided with extendable speaker boxes, which can be coupled through telescoping arms and/or speaker drive arms to a video display as in any of the embodiments described above. Each speaker box is configured to receive one or more speakers therein or to receive a speaker box containing one or more speakers. This construction facilitates quick speaker interchangeability or customization.

Referring to FIG. 11, a perspective partial sectional view of a modular speaker system in accordance with the invention is shown. Modular speaker system 300 includes outer speaker box 302, which is adapted to receive inner speaker box 304, which can correspond to either speaker 8L or 8R, which can comprise one or more speakers or speaker cones mounted in a box. Outer speaker box 302 can be provided without inner speaker box 304 or it can have inner speaker box 304 installed therein. Inner speaker box 304 includes one or more speakers or speaker cones 304a and housing or box 304b. Outer speaker box 302 can have one or more speaker supports such as top and bottom shelves 306 and 308 for supporting or restraining inner speaker box 304. The shelves can be supported by elongated members or brackets 310, which can be positioned at the desired location and secured to the inner walls of outer box 302 as shown in FIGS. 11, 12A and 12B. In FIG. 12A, the brackets are positioned in a different position than their position in FIG. 12B in order to accommodate a differently sized or configured inner speaker box. The shelf supports also can be arranged so that the shelves minimize or eliminate movement of inner speaker box 304.

Elongated members or brackets 310 can be secured to the outer box using fasteners or glue as is known in the art. Alternatively, adjustable bracket means can be used. For example, holes can be drilled into the inner walls of outer speaker box 302 and pegs inserted therein to support the shelves. The holes can be arranged to provide alternative locations for the pegs so that the shelves can be positioned at different locations to accommodate speakers of different size. Alternatively, a plurality of vertical arranged slots can be provided in opposed inner wall surfaces to form diametrically opposed and horizontally aligned slot pairs, each sized to receive a respective shelf. The adjustable peg and adjustable slot shelf holding means are conventional adjustable shelf designs, which are known in the art.

A conventional speaker cover 312, which can comprise nylon mesh, can be placed on or form the front of the outer speaker box. A plurality strips, such as strip 320, can be secured to opposed inner walls of outer speaker box 302 to engage inner speaker box 304 and secure inner speaker box 304 in speaker box 302 so that speaker box 304 does not rattle and to absorb vibrations. One strip can arranged to engage a forward end of one side of the inner speaker box. Another strip can be arranged to engage a rear end of the same side of the inner speaker box. Two more strips can be arranged to similarly engage the opposite side of the inner speaker box. The strips can comprise or be made of neoprene or any other suitable material. The thickness of the material can vary as would be apparent to one skilled in the art. Depending on the size of the speaker driver and inner speaker box 304, which houses the driver, the thickness of the strip can vary. One example can be a ⅛ inch thick neoprene strip. A rear plate, which can have a central cut out portion, such as rear plate 314, can be secured to or form the back of outer speaker box 302 to secure inner speaker box 304 therein. Fasteners 316 can be used to secure rear plate 314 to a rear portion of outer speaker box 302.

End housings or caps 318 can be rotatably coupled to the main housing of outer speaker box 302 using rotating speaker supports or swivel mounts 24L and/or 24R as described above. Shelves 322 can be used to support speaker supports 24L and/or 24R. One or more telescoping arms 22L can be coupled to end caps 318 as shown in FIG. 11. The other end of each telescoping arm is mounted to a video housing as described in any of the preceding embodiments so that the speakers can be extended therefrom. Although only one outer speaker box arrangement is shown, another can be provided and similarly coupled to the other side of an audio display as described in any of the foregoing embodiments. One of the many advantages of the modular embodiment is that a manufacturer or assembler can install different speakers according to the end users preference and customize the system the speaker box arrangement can facilitate custom speaker selection for the end user.

Referring to FIGS. 13A and 13B, rear elevational views of the system of FIGS. 1A–C are shown illustrating one embodiment of a lift mechanism in accordance with the invention. Referring to FIG. 13B, where the lift mechanism is in an extended state, lift mechanism 500 comprises two vertical plates 502 that are secured to one another through brace or bracket plate 503. Vertical plates 502 are slidably coupled to a plate 504, which is coupled to video display 6' or the back plate thereof (hidden from view) along tracks 506. Vertical plates 502 also are slidably coupled to frame or support 508 along guides or rails 510 which extend from frame or support 508. A plurality of pulleys are secured to vertical plates 502 and bracket or frame 508 as shown in FIG. 13B. Two pulley wires or ropes 512 are fed through the pulleys as shown. One end of each wire or rope 512 secured one of the two spindles or spools 514 of a reversible motor 516. The other end of each pulley wire is fixedly attached to back plate 504. The speaker drive arms are hidden from view between the display and back plate 504, which is secured to the display or the display mounting bracket (not shown). As the motor 516 is rotated in one direction the display is lifted as shown in FIG. 13B and when rotated in the other direction, the video display and speaker system, when the speakers are retracted, is allowed to return into container 410 as shown in FIG. 13A. The tension on the wire, rope, or wire rope and the amount of coiled and uncoiled wire or rope determines the position of the back plate and provides a means for adjusting the position of back plate 504. The pulley wire or rope can be of any suitable material. It can be heavy duty grade material to support the weight of the video display and speaker system. For example, it can be wire rope or cable used in the aircraft industry, such as used to control rudders. Such wire rope or cable typically comprises tightly woven stainless steel.

Referring to FIG. 13C, another lift embodiment is shown. This embodiment is a variation of the pulley arrangement illustrated in FIGS. 13A and B with the pulley arrangement modified to facilitate lowering and raising a video display and speaker system from housing 410. Among the advantages of the pulley arrangements described herein are that they can provide relatively quiet operation and/or a relatively large range of lift control.

Referring to FIGS. 14A–E, another lift mechanism is shown and generally designated with reference numeral 600. Referring to FIG. 14B which illustrates the lift mechanism in an extended state, lift mechanism 600 includes two toothed racks, which are secured to housing 410 or a bracket (not shown) inside and secured to the housing. Platform 604 forms the base of a swivel mount, which includes swivel plate 606 on which the video display and speaker system is mounted. The swivel plate is pivotally coupled to platform 604 to facilitate rotation of the video display and speaker system. However, the swivel plate is optional and the video display and speaker system can be directly mounted to platform 604.

Lift mechanism 600 also includes a reversible motor 608, which includes two shafts 610, which extend therefrom and through holes (hidden from view) in leg portions 605 of platform 604. These holes can be provided with bearings as would be apparent to one of ordinary skill. Gear wheels 612 are secured to shafts 610 and mate with toothed tracks 602. Referring to FIG. 14E, rollers 614 are secured to the ends of shafts 610 and positioned between rails 616 which are secured to housing 410 or a bracket (not shown) therein. As motor 608 rotates shafts 610 clockwise or counterclockwise, the engagement of gear wheels 610 with tracks 602 moves the motor up or down along tracks 602. This moves platform 604 and the video display and speaker system therewith. FIGS. 14C and 14D are side view of FIGS. 14A and 14B and further illustrate this motion where the video display can be hidden from view in housing 410 as shown in FIG. 14A or fully extended as shown in FIG. 14B. The gear design is advantageous for raising relatively heavy loads.

Various lift mechanisms are commercially available. One example of a commercially available lift suitable for use with the invention is plasma lift model no. PL-2000 manufactured by Display Devices, Inc. (Avada, Colo., U.S.A.). Other known video display lift mechanisms also can be used with the invention.

A remote control system for driving the powered speaker drive and/or lift mechanisms described above is diagrammatically shown in a block diagram in FIG. 15. The remote control can include a conventional signal transmitter and actuator therefor to send one or more signals to one or more signal detectors that are coupled to a speaker drive motor and/or a lift motor to provide forward and reverse control signals to the respective motor or motors which are separately coupled to suitable power. Thus, actuation of the signal transmitter can actuate the drive any of drive assembly motors to move so as to extend or retract the left, right, upper, or lower speakers and/or actuate the lift mechanism motors to raise or lower the lift any of the lift mechanisms. According to one variation, the remote control circuit can be controlled by voice recognition. Control of the speaker extension and/or lifts also can be had with infrared control devices or low voltage/contact closure control interface. The motors can be of any suitable motor design such as a 110V or 220V AC or DC reversible motor.

Any feature or combination of features of any one embodiment described herein can be combined with any other feature or combination of features of one or more of the other embodiments.

While the invention has been described with reference to specific embodiments, the invention by no means is limited to the specific embodiments illustrated and described herein. It is recognized that departures from the disclosed embodiments may be made within the scope of the invention and that obvious modifications will occur to a person skilled in the art. In addition, many modifications may be made to adapt a particular situation, material, composition of matter, process, process step or steps, to the objective, spirit and scope of the present invention. All such modifications and equivalents are intended to be within the scope of the claims appended hereto.

What is claimed is:

1. An audio visual system comprising, a video display having a front surface for viewing video information and a rear surface in opposition to the front surface, and a peripheral surface joining the front and rear surfaces; a speaker support engaged with the rear surface of the video display; and at least two speaker boxes mounted on the speaker support, the speaker boxes thereby movable linearly between extended and retracted positions, the retracted positions placing the speaker boxes at one of: adjacent to the rear surface of the video display, and thereby concealed from a viewer positioned opposite the front surface of the video display, and adjacent to the peripheral surface and in view of said viewer; the extended positions placing the speaker boxes in positions for the projection of sound in a direction away from the front surface.

2. The audio visual system of claim 1 wherein said video display comprises at least one of: a flat panel television, a flat panel video display, a flat panel monitor, and a projection screen.

3. The audio visual system of claim 1 wherein the speaker boxes move in a horizontal direction.

4. The audio visual system of claim 1 wherein the speaker boxes move in a vertical direction.

5. The audio visual system of claim 1 wherein two of the speaker boxes move in a horizontal direction and at least one of the speaker boxes moves in a vertical direction.

6. The audio visual system of claim 1 further comprising an enclosure, the enclosure providing a lift mechanism engaged with the video display and enabled for moving the video display between positions within and without the enclosure.

7. The audio visual system of claim 1 further comprising at least one screen mounted to one of the video display and the speaker support; the screen linearly extensible thereby concealing a space between the video display and the speaker box when the speaker box is in the extended position.

* * * * *